United States Patent
Fujimori

(10) Patent No.: US 8,542,242 B2
(45) Date of Patent: Sep. 24, 2013

(54) PROJECTION SYSTEM, IMAGE PROCESSOR, IMAGE PROCESSING METHOD, IMAGE PROCESSING PROGRAM, AND RECORDING MEDIUM HAVING IMAGE PROCESSING PROGRAM RECORDED THEREON

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1625 days.

(21) Appl. No.: 11/674,421

(22) Filed: Feb. 13, 2007

(65) Prior Publication Data
US 2007/0195211 A1 Aug. 23, 2007

(30) Foreign Application Priority Data
Feb. 17, 2006 (JP) .................................. 2006-040483

(51) Int. Cl.
*G09G 5/36* (2006.01)
*H04N 5/64* (2006.01)
*H04N 3/22* (2006.01)
(52) U.S. Cl.
USPC ........................... 345/545; 348/744; 348/745
(58) Field of Classification Search
USPC ......................................... 345/501, 530, 545
See application file for complete search history.

(56) References Cited

U.S. PATENT DOCUMENTS

| 4,920,504 | A | * | 4/1990 | Sawada et al. | 345/573 |
|---|---|---|---|---|---|
| 5,841,439 | A | * | 11/1998 | Pose et al. | 345/418 |
| 6,909,434 | B2 | * | 6/2005 | Takala et al. | 345/537 |
| 7,133,083 | B2 | * | 11/2006 | Jaynes et al. | 348/745 |
| 7,551,175 | B2 | * | 6/2009 | Sakanishi et al. | 345/530 |
| 2003/0193566 | A1 | * | 10/2003 | Matsuda et al. | 348/189 |
| 2004/0201594 | A1 | * | 10/2004 | Nashida et al. | 345/647 |
| 2004/0221230 | A1 | * | 11/2004 | Kakemura | 715/526 |

FOREIGN PATENT DOCUMENTS

JP A 2004-069996 3/2004

* cited by examiner

*Primary Examiner* — Joni Richer
(74) *Attorney, Agent, or Firm* — Oliff & Berridge, PLC

(57) ABSTRACT

Provided is a projection system including an image processor processing image data, the image processor acquires subsequent image data having an object included in an image temporarily subsequent to an image currently displayed by the projector. The projector stores the image data and the subsequent image data and updates the currently displayed image into the subsequent image on the basis of the subsequent image data when the update information received by the projector reception unit indicates that the currently displayed image is updated into the subsequent image.

8 Claims, 19 Drawing Sheets

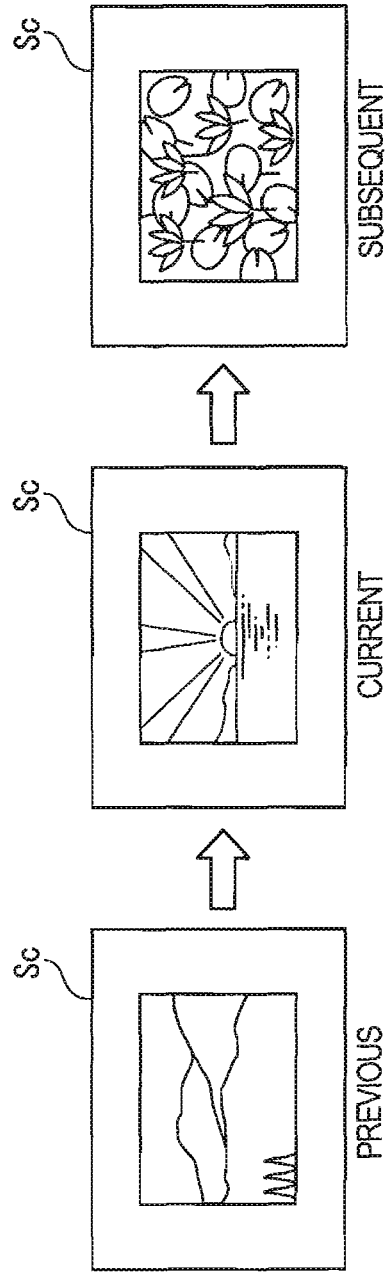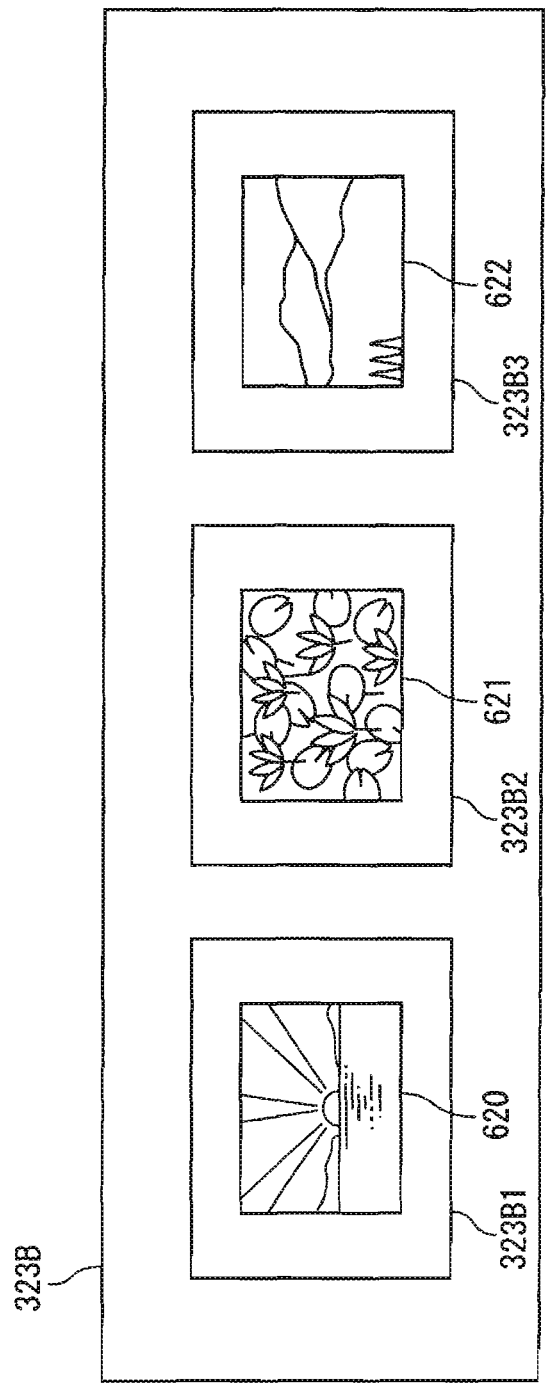

PROJECTION SYSTEM, IMAGE PROCESSOR, IMAGE PROCESSING METHOD, IMAGE PROCESSING PROGRAM, AND RECORDING MEDIUM HAVING IMAGE PROCESSING PROGRAM RECORDED THEREON

BACKGROUND

1. Technical Field

The present invention relates to a projection system, an image processor, an image processing method, an image processing program, and a recording medium having the image processing program recorded thereon.

2. Related Art

In the past, a projection system having an image processor such as a personal computer and a projector so as to display an image based on image data transmitted from the image processor by the use of the projector has been known (for example, see JP-A-2004-69996).

In JP-A-2004-6909, the image processor performs processes such as a correction of color smears and a γ correction to the image data and then transmits the image data having subjected to a variety of processes to the projector. The projector receives the image data having been subjected to a variety of processes and displays an image on the basis of the image data.

In the configuration described in JP-A-2004-69996, in order to allow the projector to display the image data selected by the image processor, it is necessary to perform a correction process of the image processor, a process of transmitting the image data from the image processor to the projector, and a process of projecting the image data in the projector. Among the processes, when the image data is transmitted using a general-purpose cable such as an USB (Universal Serial Bus) cable, it can be seen that a delay due to a low communication speed easily occurs in the process of transmitting the image data.

In the configuration for outputting images and voices of contents continuously updated at a constant interval of time, such as moving pictures, the above-mentioned delay can be seemingly avoided by using a technique of correctly synchronizing the voices with the delay of the image display, a technique of synchronizing the voices with the images by installing a speaker in the projector and transmitting voice data to the projector, and the like.

However, in the contents irregularly updated by a users operation, such as a presentation, images are updated when the user's operation is carried out. Accordingly, it is difficult to synchronize the operation with the image display and thus the user may feel the delay of the image display.

As another technique for avoiding the delay of the image display, a technique of enhancing the communication speed by compressing the image data or transmitting only the differential data from the previously transmitted image data to the projector can be considered. However, when most of the image is updated by the user's operation, such a technique exhibits a small effect and may not avoid the delay of the image display.

SUMMARY

An advantage of some aspects of the invention is that it provides a projection system, an image processor, an image processing method, an image processing program, and a recording medium having the image processing program recorded thereon, which can suppress a delay of image display in response to an operation.

According to an aspect of the invention, there is provided an projection system including an image processor processing image data, a projector modulating a light beam emitted from a light source device on the basis of the image data processed by the image processor, and an information transmitting unit connecting the image processor and the projector to each other so as to transmit and receive information therebetween. Here, the image processor includes: an image data acquiring unit acquiring the image data; a subsequent image data acquiring unit acquiring subsequent image data having an object included in an image temporarily subsequent to an image currently displayed by the projector on the basis of the image data acquired by the image data acquiring unit; an operation signal detecting unit detecting an operation signal, which indicates that the currently displayed image is updated into a predetermined image, from an operation unit provided in the image processor or the projector; an update image judging unit comparing the predetermined image with the subsequent image including the object of the subsequent image data acquired by the subsequent image data acquiring unit; an update information generating unit generating update information indicating that the currently displayed image is updated into the subsequent image or an image other than the subsequent image on the basis of the comparison result of the update image judging unit; an image data transmitting unit transmitting the image data; an update information transmitting unit transmitting the update information on the basis of an update operation of the operation unit; and a subsequent image data transmitting unit transmitting the subsequent image data in non-synchronization with the update information transmitting unit. In addition, the projector includes: a projector reception unit receiving the image data, the subsequent image data, the update information; a storage unit capable of storing a plurality of the image data and the subsequent image data; a first storage control unit storing the image data in the storage unit; a second storage control unit storing the subsequent image data in the storage unit; a display control unit displaying an image based on the image data; and an image update unit updating the currently displayed image into the subsequent image on the basis of the subsequent image data when the update information received by the projector reception unit indicates that the currently displayed image should be updated into the subsequent image.

In this configuration, the image processor acquires the image data and transmits the acquired image data to the projector. The image processor acquires the subsequent image data having the object included in the image temporarily subsequent to the image currently displayed by the projector. The image processor compares the image to be updated based on the operation signal from the operation unit with the acquired subsequent image data and generates the update information indicating that the currently displayed image should be updated into the subsequent image or the image other than the subsequent image on the basis of the comparison result. The image processor transmits the subsequent image data to the projector without synchronization with the transmission of the update information.

On the other hand, the projector stores the image data of the currently displayed image in the storage unit which can store a plurality of data for displaying an image and also stores the subsequent image data. The projector updates the currently displayed image into the subsequent image on the basis of the subsequent image data, when acquiring the update information indicating that the currently displayed image should be updated into the subsequent image.

Accordingly, the projector can store the subsequent image data transmitted without synchronization with the transmission of the update information when continuing to display a predetermined image and can update the currently displayed image into the subsequent image on the basis of the previously stored subsequent image data when acquiring the update information by means of the operation indicating that the currently displayed image should be updated into the subsequent image. For this reason, compared with the configuration for acquiring and displaying the data for the entire image from the image processor when the operation indicating that the currently displayed image should be updated into the subsequent image is performed, it is possible to reduce the amount of data to be transmitted and received after the operation. Accordingly, in the contents to be irregularly updated by means of the user's operation, the projection system can easily synchronize the operation with the image display without compressing the image data or transmitting the differential data, thereby suppressing a delay of the Image display from occurring.

In the projection system according to the aspect of the invention, when the update information generating unit generates the update information indicating that the currently displayed image should be updated into the image other than the subsequent image, the image data acquiring unit may acquire new image data for displaying the updated image, the first storage control unit may store the new image data in the storage unit, the second storage control unit may delete the stored subsequent image data when the new image data is stored, and the image update unit may update the currently displayed image into the image other than the subsequent image on the basis of the new image data.

In this configuration, when recognizing that the currently displayed image should be updated into the image other than the subsequent image, the image processor transmits the update information indicating the instruction and the new image data of the updated image. When acquiring the new image data, the projector deletes the subsequent image data and stores the new image data. Then, the projector updates the image on the basis of the new image data.

Accordingly, the projection system can suppress the delay of the image display and can properly display the user's desired image.

In the projection system according to the aspect of the invention, the image processor may further include: a previous image data acquiring unit acquiring previous image data having an object included in an image temporarily previous to an image currently displayed by the projector on the basis of the image data acquired by the image data acquiring unit; and a previous image data transmitting unit transmitting the previous image data in non-synchronization with the update information transmitting unit. The update image judging unit may compare the predetermined image with the previous image including the object of the previous image data acquired by the previous image data acquiring unit and the update information generating unit may generate the update information indicating that the currently displayed image should be updated into the previous image or an image other than the previous image. The projector reception unit may acquire the previous image data, the second storage control unit may store the previous image data in the storage unit, and the image update unit may update the currently displayed image into the previous image on the basis of the previous image data when the update information indicates that the currently displayed image should be updated into the previous image.

The image processor acquires the previous image data having the object included in the image temporally previous to the currently displayed image and transmits the acquired previous image data to the projector without synchronization with the transmission of the update information.

The projector stores the previous Image in the storage unit data and updates the currently displayed image into the previous image on the basis of the previous image data when acquiring the update information indicating that the currently displayed image should be updated into the previous image.

Accordingly, the projector can store the previous image data transmitted without synchronization with the update information when continuing to display a predetermined image and can update the currently displayed image into the previous image on the basis of the previously stored previous image data when the operation indicating that the currently displayed image should be updated into the previous image is performed. For this reason, it is possible to reduce the amount of data to be transmitted and received after the operation and to suppress the delay of the image display from occurring even when the currently displayed image should be updated into the previous image.

In the projection system according to the aspect of the invention, the subsequent image may have the object moved from a position in the current displayed image and the subsequent image data may be object image data having only the object. The update information generating unit may generate moved position information on a position of a movement destination of the object and after-movement display information having moved-portion image data for displaying a predetermined image at the position where the object has existed before the movement as the update information, when recognizing that the currently displayed image should be updated into the subsequent image on the basis of the comparison result. The projector may further include an entire subsequent image data generating unit generating entire subsequent image data for displaying the entire subsequent image on the basis of the after-movement display information, the image data of the currently displayed image, and the object image data. The second storage control unit may store the entire subsequent image data instead of the image data of the currently displayed image, and the image update unit may update the currently displayed image into the subsequent image on the basis of the entire subsequent image data, when recognizing that the projector reception unit receives the after-movement display information as the update information.

In this configuration, the subsequent image is the image in which the object is moved from the position in the currently displayed image. The subsequent image data is the object image data having only the object.

When recognizing that the currently displayed image should be updated into the subsequent image, the image processor generates the after-movement display information having the moved position information and the moved-portion image data and transmits the generated after-movement display information to the projector The projector acquires the after-movement display information and generates and stores the entire subsequent image data on the basis of the after-movement display information, the image data of the currently displayed image, and the object image data. Then, the projector updates the current displayed image into the subsequent image on the basis of the entire subsequent image data.

Accordingly, the projector can newly acquire the moved-portion image data for displaying a predetermined image at the position where the object has existed before the movement and can generate the entire subsequent image data on the basis of the previously stored image data and the object image data. That is, the projector can generate the entire subsequent image data without newly acquiring data for displaying portions other than the portions displayed by the moved-portion image data and the object image data in the subsequent image from the image processor. Accordingly, it is possible to further reduce the amount of data to be transmitted and received after the operation, thereby further suppressing the delay of the image display from occurring.

In the projection system according to the aspect of the invention, the object may be a processing state display area which displays a predetermined processing state and which can be moved in response to the operation signal from the operation unit.

In this configuration, the processing state display area which displays a predetermined processing state and which can be moved in response to the operation signal from the operation unit is used as the object.

Accordingly, it is possible to suppress the delay of the image display from occurring, even in the configuration in which the processing state display area can be properly moved and processed in response to the user's operation.

According to another aspect of the invention, there is provided an image processor which is connected to a projector so as to transmit and receive information therebetween through an information transmitting unit and which processes image data. Here, the image processor includes: an image data acquiring unit acquiring the image data; a subsequent image data acquiring unit acquiring subsequent image data having an object included n an image temporarily subsequent to an image currently displayed by the projector on the basis of the image data acquired by the image data acquiring unit; an operation signal detecting unit detecting an operation signal, which indicates that the currently displayed image is updated into a predetermined image, from an operation unit provided in the image process or the projector; an update image judging unit comparing the predetermined image with the subsequent image including the object of the subsequent image data acquired by the subsequent image data acquiring unit; an update information generating unit generating update information indicating that the currently displayed image is updated into the subsequent image or an image other than the subsequent image on the basis of the comparison result of the update image judging unit; an image data transmitting unit transmitting the image data; an update information transmitting unit transmitting the update information on the basis of an update operation of the operation unit; and a subsequent image data transmitting unit transmitting the subsequent image data in non-synchronization with the update information transmitting unit.

The above-mentioned image processor can be used as an image processor suitable for the above-mentioned projection system.

According to another aspect of the invention, there is provided an image processing method of processing image data in an Image processor connected to a projector so as to transmit and receive information therebetween through an information transmitting unit. Here, the image processing method includes: acquiring the image data; acquiring subsequent image data having an object included In an image temporarily subsequent to an image currently displayed by the projector on the basis of the acquired image data; detecting an operation signal, which indicates that the currently displayed image is updated into a predetermined image, from an operation unit provided in the image processor or the projector; comparing the predetermined image with the subsequent image including the object of the acquired subsequent image data; generating update information indicating that the currently displayed image is updated into the subsequent image or an image other than the subsequent image on the basis of the comparison result; transmitting the image data; transmitting the update information on the basis of an update operation of the operation unit; and transmitting the subsequent image data in non-synchronization with the transmitting of the update information.

According to another aspect of the invention, there is provided an image processing program which is executed by an image processor connected to a projector so as to transmit and receive information therebetween through an information transmitting unit. The image processing program allows the image processor to perform: acquiring the image data; acquiring subsequent image data having an object included in an image temporarily subsequent to an image currently displayed by the projector on the basis of the acquired image data; detecting an operation signal, which indicates that the currently displayed image is updated into a predetermined image, from an operation unit provided in the image processor or the projector; comparing the predetermined image with the subsequent image including the object of the acquired subsequent image data; generating update information indicating that the currently displayed image is updated into the subsequent image or an image other than the subsequent image on the basis of the comparison result; transmitting the image data; transmitting the update information on the basis of an update operation of the operation unit; and transmitting the subsequent image data in non-synchronization with the transmitting of the update Information.

According to another aspect of the invention, there is provided a recording medium having the image processing program recorded thereon in which the image processing program is readable by a computer.

Since the image processing method, the image processing program, and the computer-readable recording medium according to some aspects of the invention are used to allow the projection system to perform the above-mentioned processes, it is possible to obtain the same operational advantages as the projection system.

BRIEF DESCRIPTION OF THE DRAWINGS

The invention will be described with reference to the accompanying drawings, wherein like numbers reference like elements.

FIG. 4A shows a storage state of an image storage unit and FIG. 4B shows a display state of an image on a screen.

FIG. 5B shows the display state of an image on the screen.

FIG. 6A shows the storage state of the image storage unit and FIG. 5B shows the display state of an image on the screen.

FIGS. 10A and 10B are schematic diagrams illustrating a still image sequence and a storage state of an image storage unit according to the second embodiment of the inventions where FIG. 10A shows the still image sequence and FIG. 10B shows the storage state of the image storage unit.

FIG. 14A shows the storage state of the image storage unit when object image data are generated on the basis of moving object information and FIG. 14B shows the storage state of the image storage unit when the current image data is updated into the after-movement image data in the state shown in FIG. 14A.

DESCRIPTION OF EXEMPLARY EMBODIMENTS

First Embodiment

Figure 1:
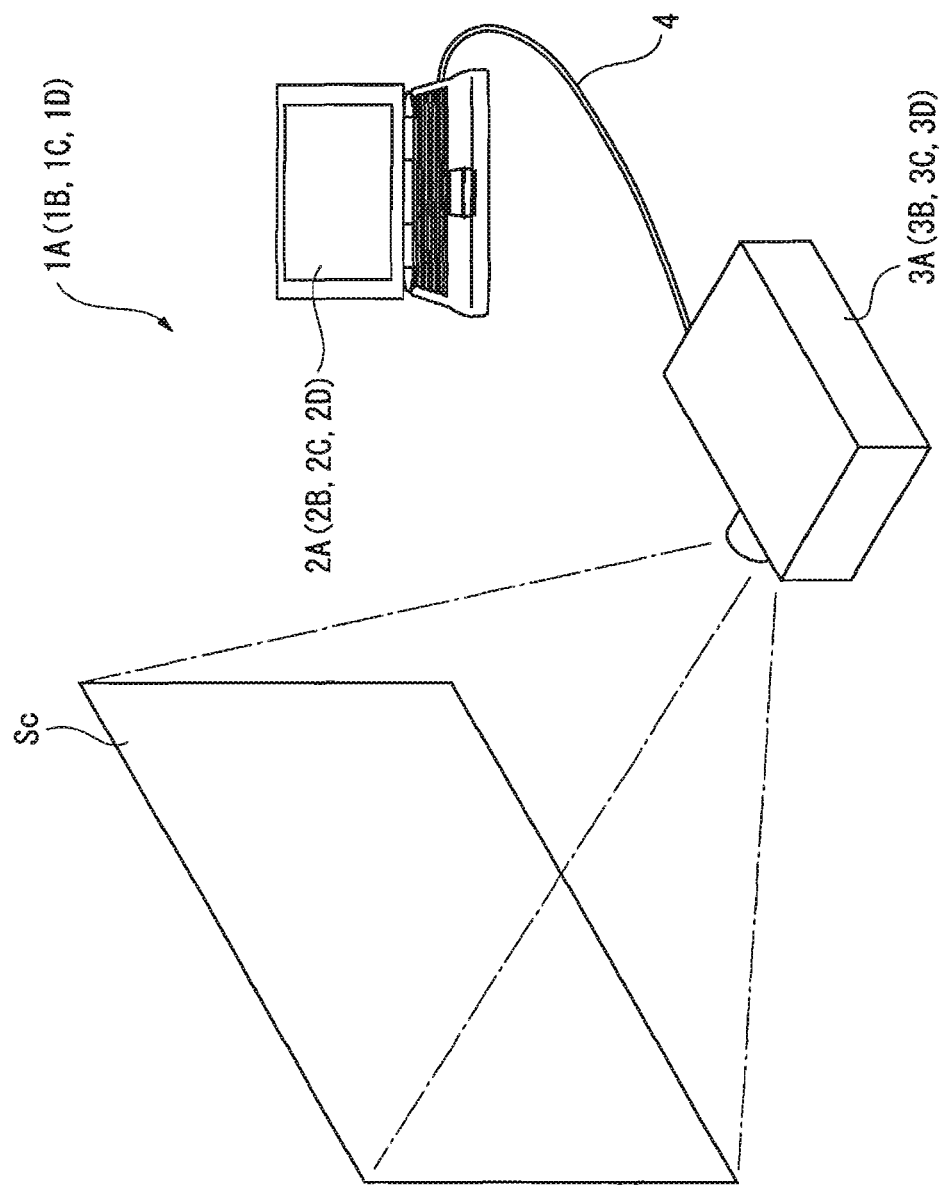
FIG. 1 is a diagram illustrating an outer configuration of a projection system according to first to fourth embodiments of the invention.

Hereinafter, a first embodiment of the invention will be described with reference to the drawings.
Configuration of Projection System FIG. 1 is a diagram illustrating an outer configuration of a projection system 1A according to the first embodiment of the invention.

Figure 2:
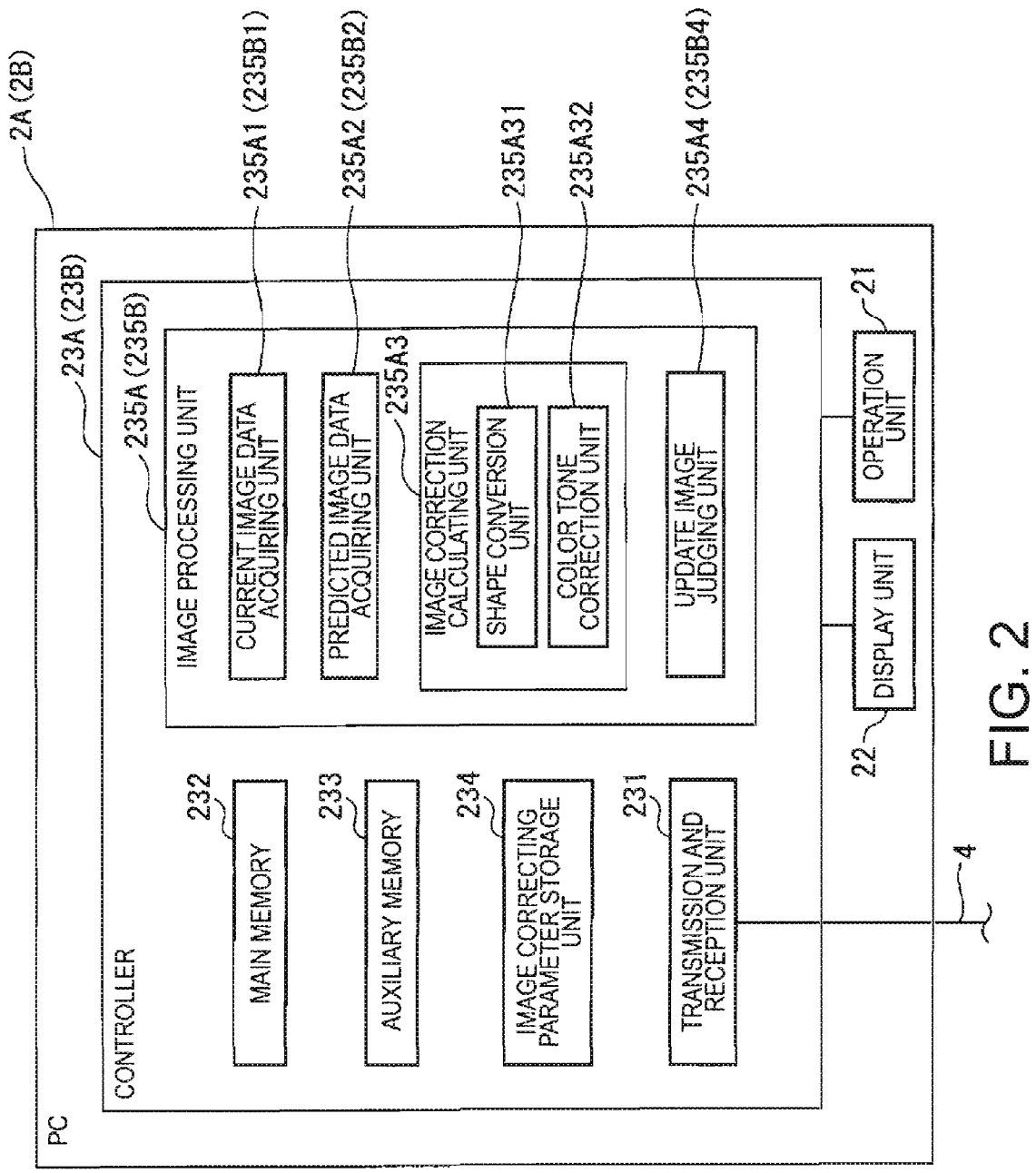
FIG. 2 is a block diagram illustrating a schematic configuration of a personal computer (PC) according to the first and second embodiments.

The projection system 1A includes a PC 2A (image processor) processing image data, a projector 3A projecting a predetermined image onto a screen Sc for display on the basis of the image data from the PC 2A, and an USB (Universal Serial Bus) cable 4 (information transmitting unit) connecting the PC 2A and the projector 3A to each other so as to transmit and receive a variety of information therebetween.
Configuration of PC FIG. 2 is a block diagram illustrating a schematic configuration of the PC 2A.

The PC 2A includes an operation unit 21, a display unit 22, and a controller 23A.

The operation unit 21 has a variety of operation buttons which are pressed by, for example, a keyboard, a mouse, and the like. By allowing a user to operate the operation unit 21, the operation unit 21 properly outputs a predetermined operation signal to the controller 23A.

The operation unit 21 is not limited to the input operation of the operation buttons, but may have a configuration for setting and inputting a variety of conditions by means of, for example, an input operation using a touch panel, an input operation using a voice, and the like.

The display unit 22 displays predetermined information under the control of the controller 23A. The display unit 22 properly displays, for example, information processed by the controller 23A or data in a main memory 232 output from the controller 23A at the time of setting and inputting or updating information stored in the main memory 232 of the controller 23A by means of the input operation of the operation unit 21.

The controller 23A performs a predetermined program to control the entire PC 2A in response to the input of the operation signal from the operation unit 21. The controller 23A includes a transmission and reception unit 231 (image data transmitting unit, subsequent image data transmitting unit, update information transmitting unit), a main memory 232, an auxiliary memory 233, an image correction parameter storage unit 234, and an image processing unit 235A, which are connected so as to transmit necessary information through a bus not shown.

The transmission and reception unit 231 is connected to the projector 3A through the USB cable 4 so as to transmit thereto and receive therefrom a variety of data. The transmission and reception unit 231 transmits a variety of information output from the image processing unit 235A to the projector 3A through the USB cable 4.

The main memory 232 stores data and the like to be processed by the image processing unit 235A. Examples of the data can include the operation signal output from the operation unit 21, data input through the transmission and reception unit 231, and data to be processed by the image processing unit 235A.

The auxiliary memory 233 stores presentation image data for displaying an image showing a variety of details in a previously set sequence (hereinafter, referred to as presentation sequence) at the time of presentation Examples of the auxiliary memory 233 can include a HD (Hard Disc), a DVD (Digital Versatile Disc), an optical disc, and a memory card.

The image correction parameter storage unit 234 stores a correction parameter for correcting an image on the basis of the characteristics of the projector 3A.

Examples of the correction parameter stored in the image correction parameter storage unit 234 can include a variety of correction parameters for trapezoidal correction, color conversion, $\gamma$ correction, VT-$\gamma$ correction, and the like.

The memory card or the CD-ROM storing the correct-on parameters may be loaded into the PC 2A and the correction parameters may be installed in the image correction parameter storage unit 234. Alternatively, the PC 2A may read out a predetermined correction parameter from the projector 3A through the USE cable 4 and store the read correction parameter in the image correction parameter storage unit 234.

The image processing unit 235A includes a GPU (Graphics Processor Unit) and the like and serves to perform the above-mentioned corrections. The image processing unit 235A includes a current image data acquiring unit 235A1 (image data acquiring unit), a predicted image data acquiring unit 235A2 (subsequent image data acquiring unit )1 an image correction calculating unit 235A3, and an update image judging unit 235A4 (operation signal detecting unit, update information generating unit).

The current image data acquiring unit 235A1 acquires the presentation image data of the auxiliary memory 233 under the control of the update image judging unit 235A4. The current image data acquiring unit 235A1 generates and acquires current image data 600 (image data: for example, see FIGS. 4A and 4B) for allowing the projector 3A to display a desired image selected by the user on the basis of the presentation image data.

The predicted image data acquiring unit 235A2 generates and acquires predicted image data 601 (subsequent image data: for example, see FIGS. 4A and 4B) for displaying the entire image subsequent to the current image data 600 in the presentation sequence on the basis of the presentation image data under the control of the update image judging unit 235A4. That is, the predicted image data acquiring unit 235A2 acquires the predicted image data 601 for displaying the entire image subsequent to the current image data 600 in time series.

Here, an example of the method of generating and acquiring the predicted image data 601 is provided by OpenGL (registered trademark developed by Silicon Graphics Inc.) which is a graphic programming interface not relying on the OS (Operating System).

The image correction calculating unit 235A3 includes a shape conversion unit 235A31 and a color tone correction unit 235A32.

The shape conversion unit 235A31 performs a shape conversion process to the current image data 600 and the predicted image data 601, that is, a trapezoidal correction process, a correction process performed along the shape of a screen Sc when the screen Sc is curved, a distortion correcting process due to a lens built in the projector 3A. The shape conversion unit 235A31 outputs the current image data 600 and the predicted image data 601 having been subjected to the shape conversion process to the color tone correction unit 235A32.

The color tone correction unit 235A32 performs a conversion and correction process (color tone correcting process, corresponding to the color characteristics of the projector 3A to the current image data 600 and the predicted image data 601 output from the shape conversion unit 235A31. Examples of the color tone correcting process can include a color conversion process, a γ correction process, and a VT-γ correction process. For example, by performing the color tone correcting process, the color data originally having 8 bits are corrected with precision of 10 bits or more. The color tone correction unit 235A32 properly transmits the current image data 600 and the predicted image data 601 having been subjected to the above-mentioned image process (the shape conversion process and the color tone correcting process) to the projector 3A through the transmission and reception unit 231 and the USB cable 4.

The update image judging unit 235A4 detects the operation signal from the operation unit 21 and recognizes that a predetermined image should be displayed on the basis of the operation signal. When the current image data 600 is previously transmitted to the projector 3A, or when the current image data 600 is first transmitted, the update image judging unit 235A4 controls the current image data acquiring unit 235A1 to acquire the current image data 600 of the image to be displayed. The update image judging unit 235A4 transmits the current image data 600 having been subjected to the image process to the projector 3A.

When recognizing that the operation signal indicating that the currently displayed image should be updated is not detected, for example, in a predetermined time after transmitting the current image data 600, the update image judging unit 235A4 controls the predicted image data acquiring unit 235A2 to acquire the predicted image data 601 and then transmits the predicated image data 601 having been subjected to the image process to the projector 3A.

Here, an example in which it is not recognized that the image should be updated in a predetermined time after transmitting the current image data 600 can include a case where the currently displayed image is explained and the update of the image is not necessary.

When detecting the operation signal indicating the update into a predetermined image while previously transmitting the predicted image data 601 to the projector 3A, the update image judging unit 235A4 compares the image of the predicated image data 601 with the image to be updated and judges whether the image should be updated into an image subsequent to the currently displayed image in the presentation sequence, that is, whether the image should be updated into an image based on the predicted image data 601 previously transmitted. When it is judged that the image should be updated into the image based on the predicted image data 601, that Is, when the prediction is successful, the update image judging unit 235A4 generates a SWAP signal (update information) indicating the update and transmits the SWAP signal to the projector 3A.

On the other hand, when the image should be updated into an image not based on the predicted image data 601, the update image judging unit 235A4 transmits a disuse signal (update information) indicating the disuse of the predicted image data 601 to the projector 3A and then controls the current image data acquiring unit 235A1 to transmit the current image data 600 of the image having been updated to the projector 3A.

Configuration of Projector

Figure 3:
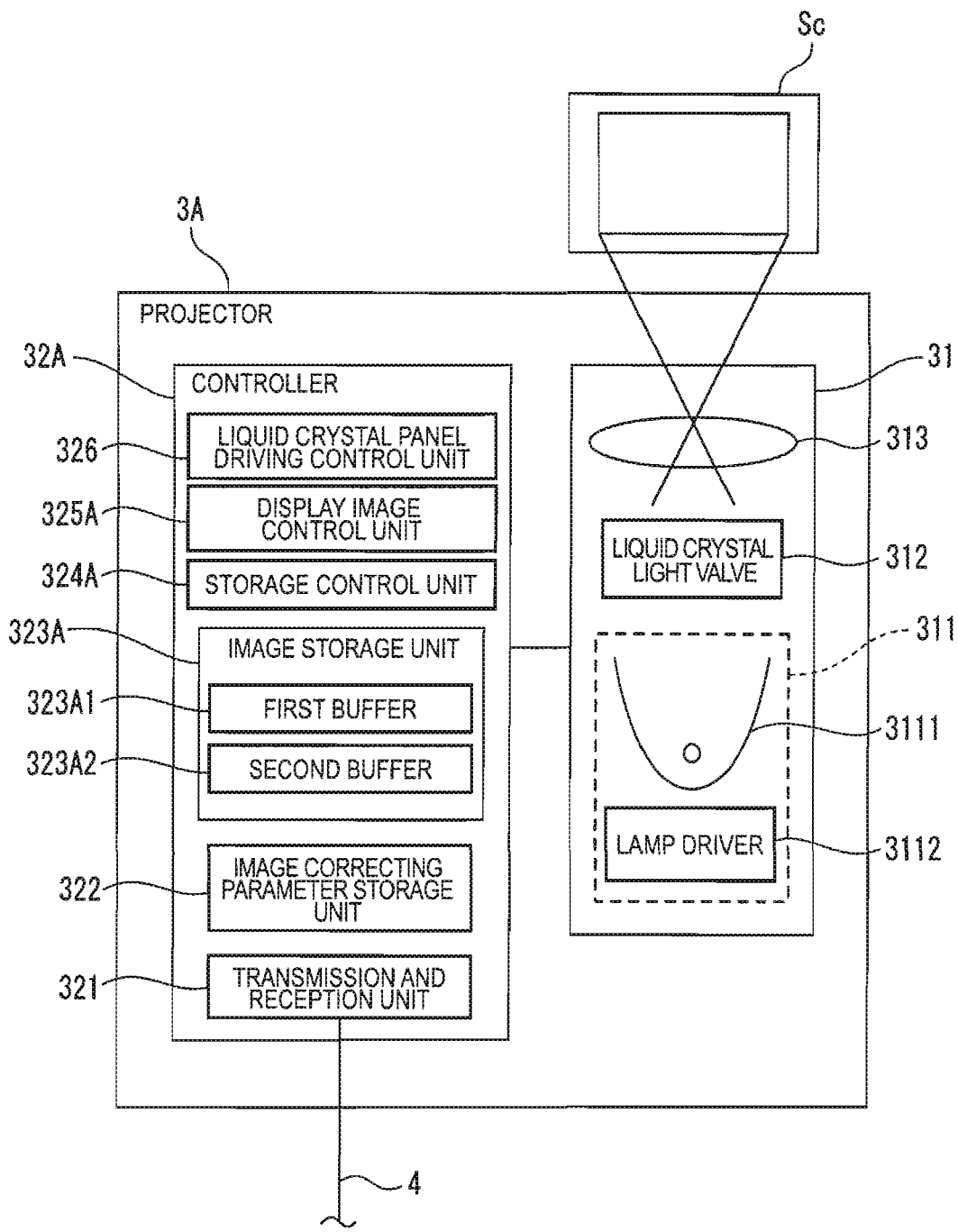
FIG. 3 is a block diagram illustrating a schematic configuration of a projector according to the first embodiment.
Figure 4A:
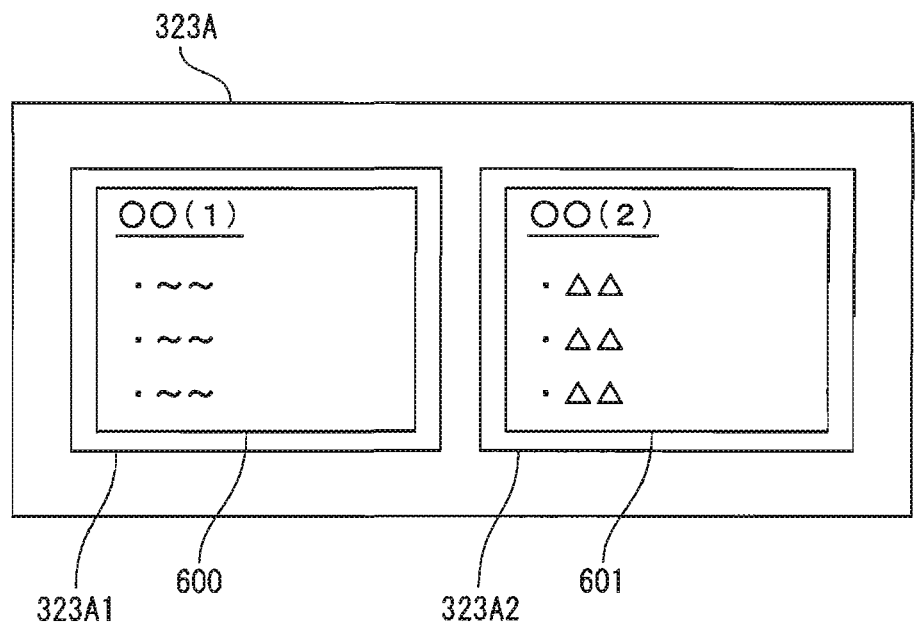
FIGS. 4A and 4B are diagrams schematically illustrating a display state of an image when current image data and predicted image data are retained according to the fist embodiment of the invention, where
Figure 4B:
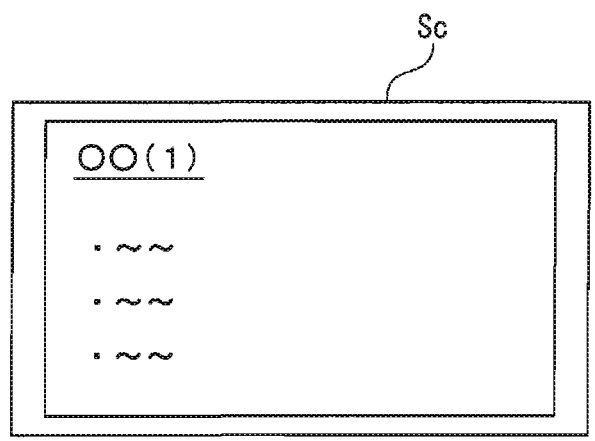
Figure 5A:
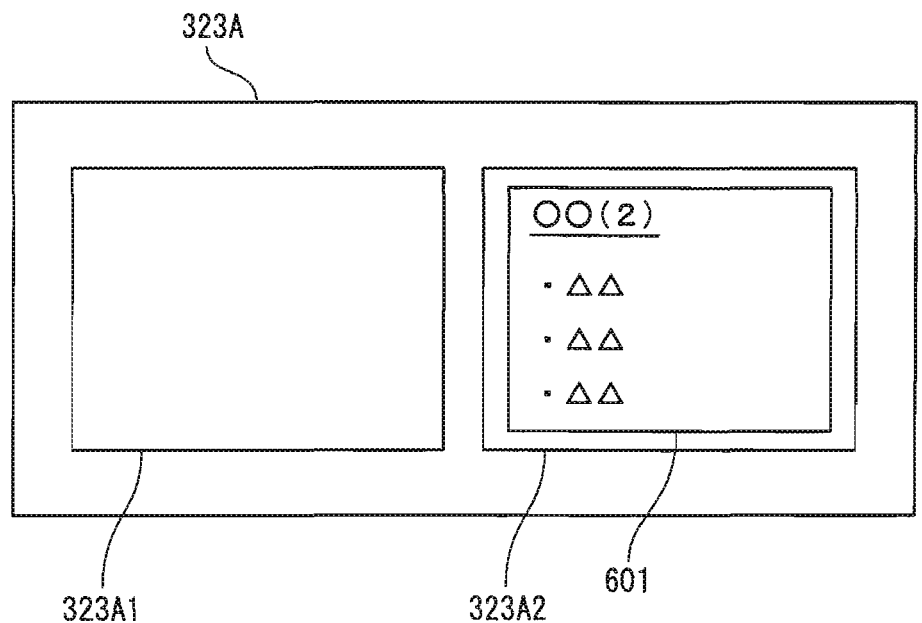
FIGS. 5A and 5B are schematic diagrams illustrating a storage state of the image storage unit and a display state of an image after a SWAP signal is received in the state shown in FIGS. 4A and 4B according to the first embodiment of the invention, where FIG. 5A snows the storage state of the image storage unit
Figure 5B:
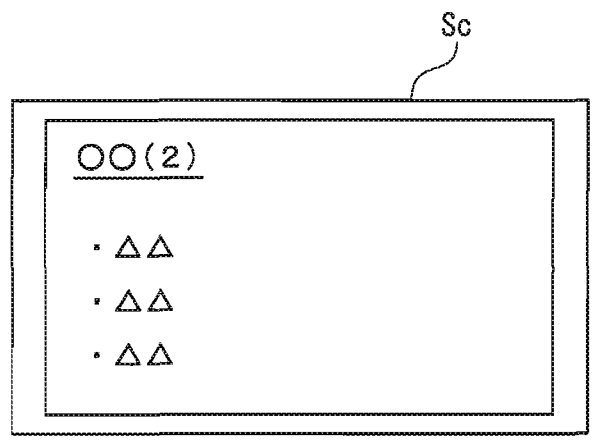
Figure 6A:
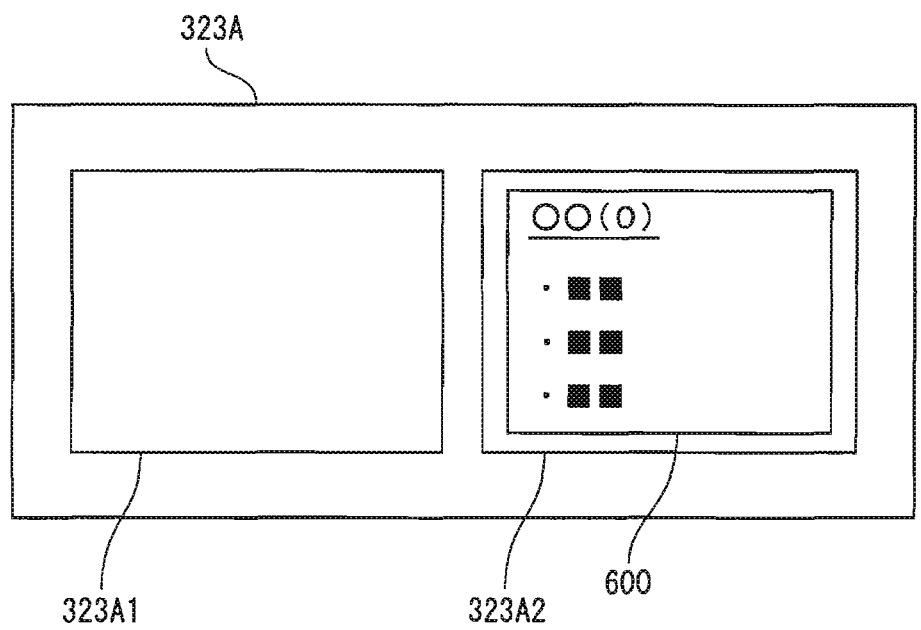
FIGS. 6A and 6B are schematic diagrams illustrating a storage state of the image storage unit and a display state of an image after a disuse signal is received in the state shown in FIGS. 4A and 4B according to the first embodiment of the invention, where
Figure 6B:
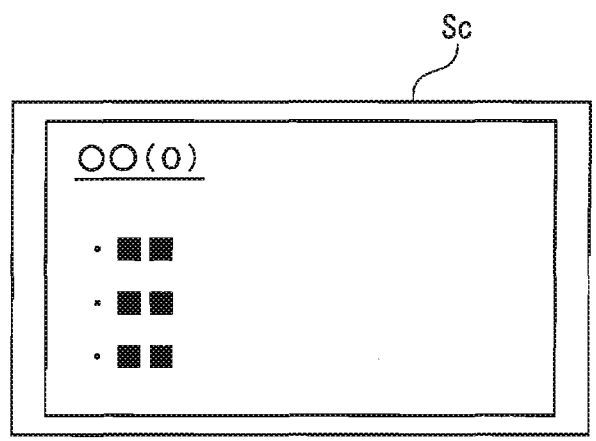

FIG. 3 is a block diagram illustrating a schematic configuration of the projector 3A. FIGS. 4A and 4B are diagrams schematically illustrating a display state of an image when the current image data 600 and the predicted image data 601 are retained, where FIG. 4A snows a storage state of the image storage unit 323A and FIG. 4B shows a display state of an image on the screen Sc. FIGS. 5A and 5B are schematic diagrams illustrating a storage state of the image storage unit 323A and a display state of an image after the SWAP signal is received in the state shown in FIGS. 4A and 4B, where FIG. 5A shows the storage state of the image storage unit 323A and FIG. 5B shows the display state of an image on the screen Sc. FIGS. 6A and 6B are schematic diagrams illustrating a storage state of the image storage unit 323A and a display state of an image after the disuse signal is received in the state shown in FIGS. 4A and 4B, where FIG. 6A shows the storage state of the image storage unit 323A and FIG. 6B shows the display state of an image on the screen Sc.

The projector 3A includes an image projection unit 31 and a controller 32A, as shown in FIG. 3.

The image projection unit 31 forms an optical image and enlarges and projects the formed optical image onto the screen Sc under the control of the controller 32A. As shown in FIG. 3, the image projection unit 31 includes a light source device 311, a liquid crystal light valve 312, and a projection optical device 313.

The light source device 311 emits a light beam to the liquid crystal light valve 312 under the control of the controller 32A. The light source device 311 includes a light source lamp 3111 and a lamp driver 3112.

The light source lamp 3111 includes a super high-pressure mercury lamp. The light source lamp 3111 is not limited to the super high-pressure mercury lamp, but may employ other discharging type light source lamps such as a metal halide lamp and a xenon lamp. The light source lamp 3111 is not limited to the discharging type light source lamps, but may employ a variety of self light-emitting elements such as a light emitting diode, a laser diode, an organic EL element, and a silicon light-emitting element.

The lamp driver 3112 drives the light source lamp 3111 with a predetermined drive voltage under the control of the controller 32A.

The liquid crystal light valve 312 is a transmissive liquid crystal panel and emits an optical image corresponding to the current image data 600 or the predicted image data 601 processed by the PC 2A to the projection optical device 313 by varying the alignment of liquid crystal molecules sealed in a liquid crystal cell (not shown) on the basis of the drive signal from the controller 32A to transmit or block the light beam emitted from the light source lamp 3111.

The projection optical device 313 enlarges and projects the optical image emitted from the liquid crystal light valve 312 onto the screen Sc.

Although not shown, the projector 3A includes three liquid crystal light valves 312 corresponding to three colors of R, G, and B. The light source device 311 includes a color separating optical system for separating the light source light in-to three color beams. The projection optical device 313 has a synthesizing optical system synthesizing three color image beams to generate an optical image representing a color image. Configurations of various optical systems of general projectors can be used as the configuration of the optical system.

The controller 32A controls the entire projector 3A in accordance with control commands from the PC 2A. The controller 32A includes a transmission and reception unit 321 (projector reception unit), an image correction parameter storage unit 322, an image storage unit 323A (storage unit), a storage control unit 324A (first storage control unit, second storage control unit) a display image control unit 325A (display control unit, image update unit), and a liquid crystal panel driving control unit 326, which are connected to transmit necessary information through a bus not shown.

The transmission and reception unit 321 is connected to the PC 2A through the USB cable 4 so as to transmit and receive a variety of data. The transmission and reception unit 321 receives a variety of information transmitted from the PC 2A and outputs the received information to the storage control unit 324A.

The image correction parameter storage unit 322 stores a correction parameter for correcting an image on the basis of the characteristics of the projector 3A. Examples of the correction parameter can include a variety of parameters for a trapezoidal correction process, a brightness smear correction process, a color smear correction process, a γ correction process, and the like.

The image storage unit 323A includes a first buffer 323A1 and a second buffer 323A2. The first and second buffers 323A1 and 323A2 store the current image data 600 and the predicted image data 601, respectively.

The storage control unit 324A properly acquires the current image data 600 or the predicted image data 601 transmitted from the PC 2A. The storage control unit 324A performs a process of properly storing the data in the image storage unit 323A, that is, a storage process. The storage control unit 32-4A also performs a process of properly deleting the image data from the image storage unit 323A, that is, a disuse process, under the control of the display image control unit 325A.

When only the current image data 600 is stored in the image storage unit 323A, the display image control unit 325A outputs the current image data 600 to the liquid crystal panel driving control unit 326 to display an image based on the current image data 600 on the screen Sc.

The display image control unit 325A continues to display the image, when the predicted image data 601 is also stored in the state where only the current image data 600 is stored in the image storage unit 323A and the image based on the current image data 600 is displayed. That is, as shown in FIG. 4A, when the current image data 600 and the predicted image data 601 are stored in the image storage unit 323A, the display image control unit 325A displays the image based on the current image data 600 on the screen Sc as shown in FIG. 4B.

When the SWAP signal is acquired from the PC 2A in the state shown in FIGS. 4A and 4B, it means that the prediction is successful Accordingly, the display image control unit 395A recognizes that the displayed image should be updated into the image based on the predicted image data 601 in the presentation sequence. The display image control unit 325A outputs the predicted image data 601 to the liquid crystal panel driving control unit 326 to display the image based on the predicted image data 601 on the screen Sc. Further, the display image control unit 325A controls the storage control unit 324A to disuse the current image data 600. That is, the display image control unit 325A disuses the current image data 600 from the image storage unit 323A as shown in FIG. 5A and displays the image of the predicted image data 601 as shown in FIG. 5B.

When the disuse signal is acquired from the PC 2A in the state shown in FIGS. 4A and 4B, it means that the prediction is failed. Accordingly, the display image control unit 325A recognizes that the displayed image should be updated into the image based on the current image data 600 transmitted along with the disuse signal. The display image control unit 325A controls the storage control unit 324A to disuse the predicted image data 601 and to retain the newly acquired current image data 600. The display image control unit 325A outputs the new current image data 600 to the liquid crystal panel driving control unit 326 to display an image based on the current image data 600. The display image control unit 325A disuses the current image data 600 used for the previous display. That is, the display image control unit 325A disuses the predicted image data 601 and the current image data 600 used for the previous display from the image storage unit 323A and retains the new current image data 600 as shown in FIG. 6A, and displays the image based on the new current image data 600 as shown in FIG. 6B.

The liquid crystal panel driving control unit 326 outputs drive signals based on the current Image data 600 or the predicted image data 601 from the display image control unit 325A to the liquid crystal light valves 312 to form an optical image in the liquid crystal light valves 312.

Operation of Projection System

Figure 7:
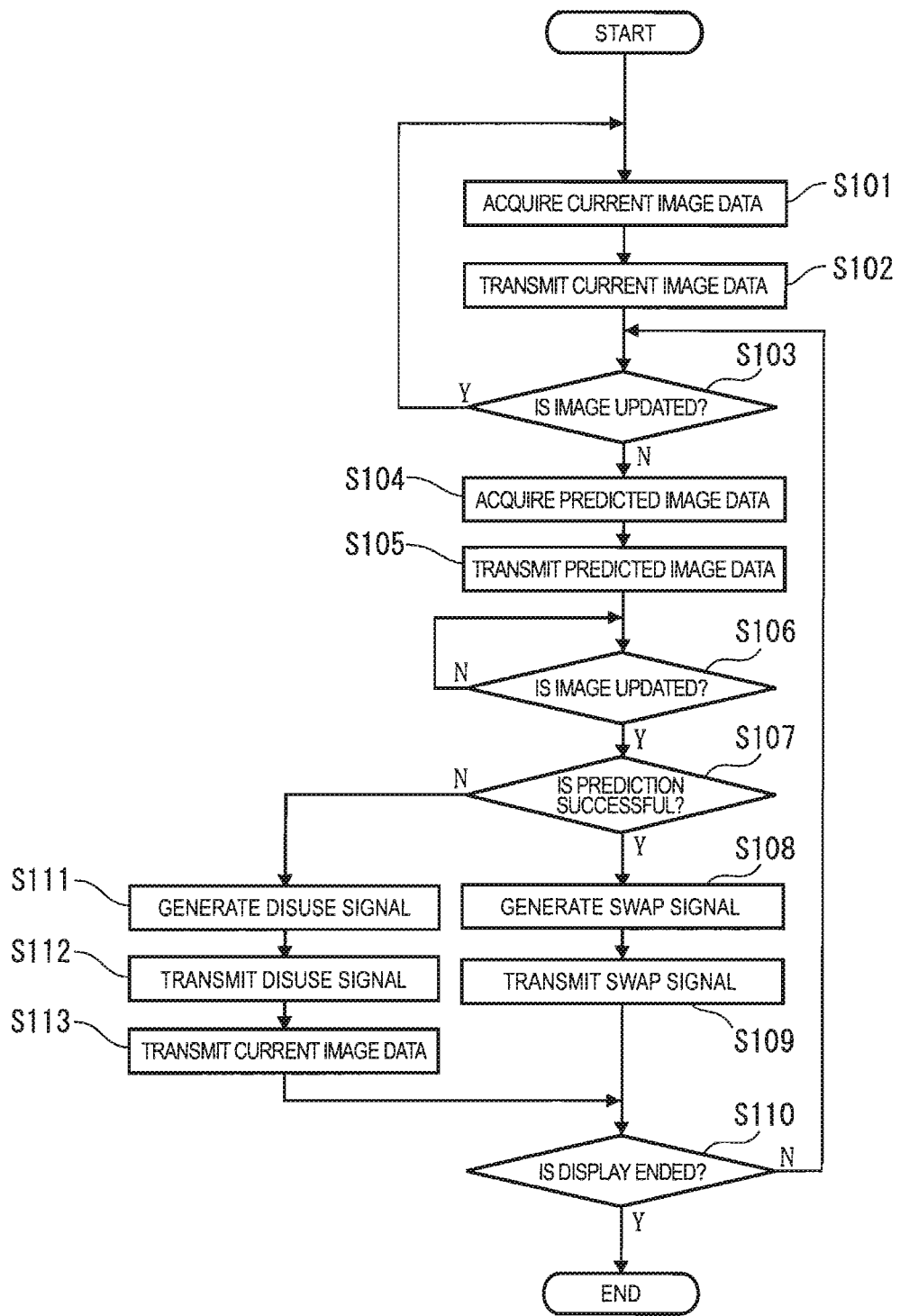
FIG. 7 is a flowchart illustrating an operation of the PC in an image displaying process according to the first embodiment of the invention.
Figure 8:
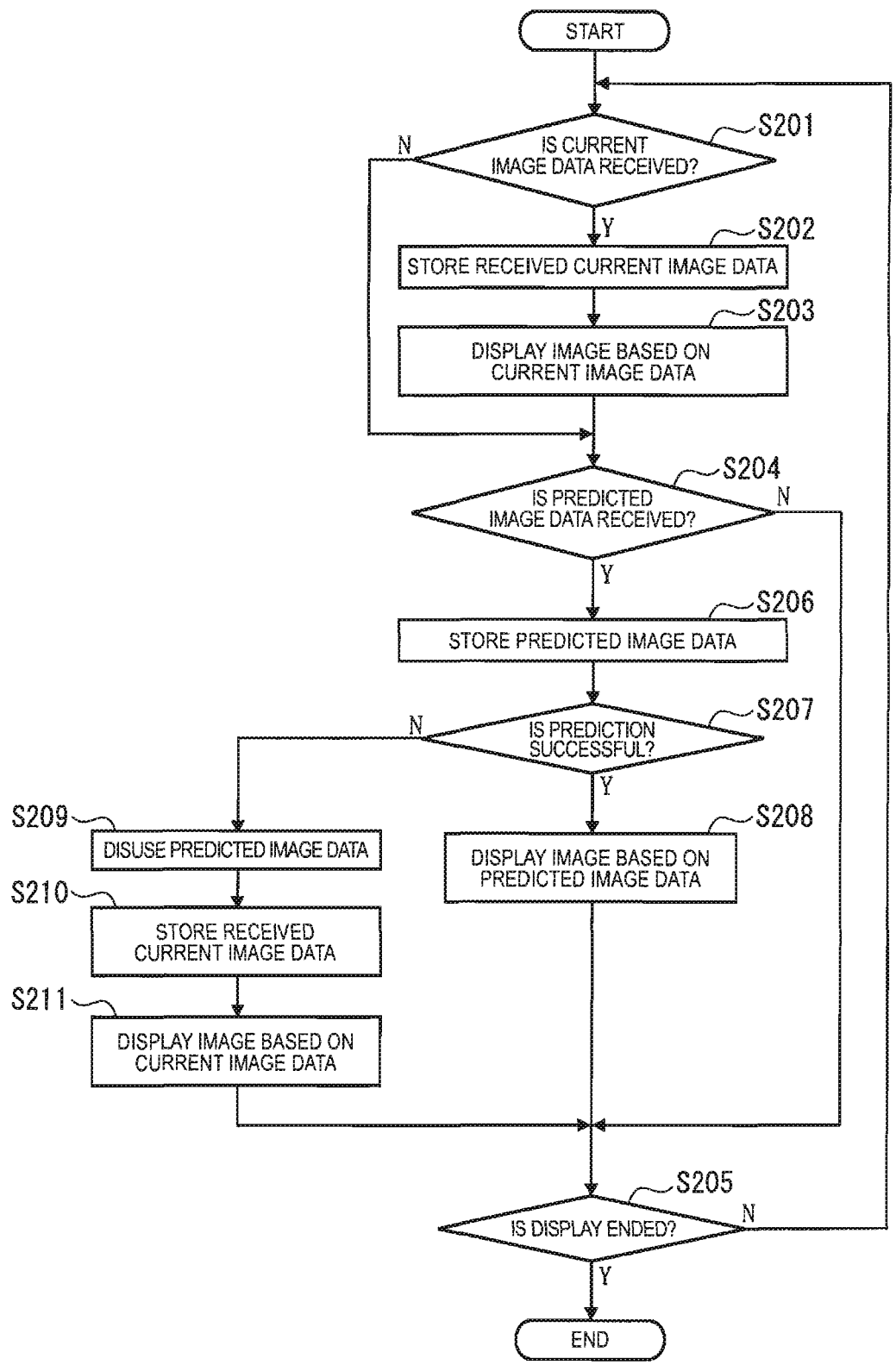
FIG. 8 is a flowchart illustrating an operation of the projector in the image displaying process according to the first embodiment of the invention.

An image displaying process will be described as an operation of the above-mentioned projection system 1A. FIG. 7 is a flowchart illustrating an operation of the PC 2A in the image displaying process. FIG. 8 is a flowchart illustrating an operation of the projector 3A in the image displaying process.

Operation of PC

When recognizing a user's operation for displaying a predetermined image, as shown in FIG. 7, the PC 2A first acquires the current image data 600 (step S101: acquisition of image data) and transmits the current image data 600 having been subjected to an image process (S102: transmission of image data). Then, the PC judges whether an operation for updating an image has been performed (step S103).

When judging in step S103 that the image should be updated, the PC performs the process of step S101.

On the other hand, when judging in step S103 that the image should not be updated, for example, when the displayed image is explained and the image update is not necessary, the PC acquires the predicted image data 601 having been subjected to the image process in the presentation sequence (step S104: acquisition of subsequent image data). The PC 2A transmits the predicted image data 601 to the projector 3A (step S105: transmission of subsequent image data). Thereafter, the update image judging unit 235A4 judges whether an operation for updating an image has been performed (step S106: detection of operation signal).

When it is judged in step S106 that the image should not be updated, the process of step S106 is performed again, for example, in a predetermined time thereafter.

On the other hand, when it is judged in step S106 that the image should be updated, the PC 2A judges whether the image should be updated into the previously transmitted predicted image data 601, that is, whether the prediction is successful, on the basis of the presentation sequence (step S107: judgment of update image).

When it is judged in step S107 that the prediction is successful, the PC 2A generates the SWAP signal (step S108: generation of update information), transmits the generated SWAP signal to the projector 3A (step S109: transmission of update information), and judges whether the display should be ended (step S110) When it is judged in step S110 that the display should be ended, the flow of processes is ended. On the other hand, when it is judged in step S110 that the display should not be ended, the process of step S103 is performed again.

When it is judged in step S107 that the prediction is failed, the PC 2A generates the disuse signal (step S111: generation of update information and transmits the generated disuse signal to the projector 3A (step S112: transmission of the update information). The PC 2A transmits the current image data 600 having been subjected to the image process (step S113) and performs the process of step S110.

Operation of Projector

The projector 3A judges whether the storage control unit 324A receives the current image data 600 from the PC 2A, as shown in FIG. 8 (step S201).

When it is judged in step S201 that the current image data 600 is received, the projector 3A stores the current image data 600 in the image storage unit 323A (step S202) and displays an image based on the current image data 600 (step S203). Thereafter, the storage control unit 324A judges whether the predicted image data 601 is received from the PC 2A (step S204). When it is judged in step S201 that the current image data 600 is not received, the process of step S204 is also performed.

When it is judged in step S204 that the predicted image data 601 is not received, the projector 3A judges whether the display should be ended (step S205). When it is judged in step S205 that the display should be ended, the flow of processes is ended. On the other hand, when It is judged in step S205 that the display should not be ended, the process of step S201 is performed again.

When it is judged in step S304 that the predicted image data 601 is received, the storage control unit 324A stores the predicted image data, 601 in the image storage unit 323A (step S206).

After the process of step S206, the storage state of the image storage unit 323A and the display state of an image are as shown in FIGS. 4A and 4B.

Thereafter, the display image control unit 325A judges whether the SWAP signal is received, that is, whether the prediction is successful (step S207).

When it is judged in step S207 that the prediction is successful, the display image control unit 325A disuses the current image data 600, displays an image based on the predicted image data 601 in the presentation sequence (step S208) and then performs the process of step S205.

After the process of step S208, the storage state of the image storage unit 323A and the display state of an Image are as shown in FIGS. 5A and 5B.

On the other hand, when it is judged in step S207 that the prediction is failed, that is, when the disuse signal is received, the display image control unit 325A disuses the predicted image data 601 (step S209), then stores the current image data 600 received from the PC 2A (step S210), and displays the image based on the current image data 600 (step S211). The display image control unit 325A disuses the current image data 600 corresponding to the image previously displayed.

Operational Advantage of First Embodiment

The first embodiment described above provides the following operational advantages.

(1) The PC 2A of the projection system 1A acquires the predicted image data 601 temporally subsequent to the image of the current image data 600 currently displayed by the projector 3A in the presentation sequence and transmits the predicted image data 601 to the projector 3A in non-synchronization with the SWAP signal or the disuse signal. Thereafter, the PC 2A properly transmits a signal for updating the currently displayed image to the projector 3A on the basis of the operation signal from the operation unit 21.

On the other hand, the projector 3A stores the current image data 600 corresponding to the currently displayed image in the image storage unit 323A. When acquiring the predicted image data 601, the projector 3A stores the predicted image data 601 in the image storage unit 323A. When receiving the SWAP signal from the PC 2A, the projector 3A recognizes that the displayed image should be updated into the image corresponding to the predicted image data 601 in the presentation sequence and updates the current displayed image into the image based on the predicted image data 601.

Accordingly, for example, when the currently displayed image is explained and the image continues to be displayed, the projector 3A stores the predicted image data 601 transmitted in non-synchronization with the transmission of the SWAP signal or the disuse signal. When the user's operation for updating the displayed image into the image based on the presentation sequence is performed, the projector 3A can update the currently displayed image into the image of the predicted image data 601 previously stored. Accordingly, compared with the configuration for receiving the predicted image data 601 from the PC 2A and displaying the image of the predicted image data 601 when the operation for updating the displayed image into the image based on the presentation sequence is performed, it is possible to further reduce the amount of data transmitted and received after the operation. Therefore, in the presentation to be irregularly updated by means of the user's operation, the projection system 1A can easily synchronize the operation with the display of an image without compressing the predicated image data 601 or transmitting the differential data, thereby suppressing a delay of the image display from occurring.

(2) ashen recognizing that the currently displayed image should be updated into the image other than the image subsequent to the currently displayed image in the presentation sequence, the PC 2A transmits the disuse signal and the current image data 600 of a new image after update to the projector 3A. When acquiring the new current image data 600, the projector 3A deletes the predicted image data 601 and stores the new current image data 600. The displayed image is updated into the image corresponding to the new current image data 600.

Accordingly, the projection system 1A can suppress the delay of the image display and can properly display the user's desired image.

(3) The PC 2A transmits the predicted image data 601 for displaying the entire image subsequent to the current image data 600 in time series.

Accordingly, the projector 3A can retain the predicted image data 601 without newly generating the predicted image data 601, for example, on the basis of the current image data 600. Therefore, it is possible to reduce the processing load at the time of retaining the predicted image data 601.

Second Embodiment

Next, a second embodiment of the invention will be described with reference to the drawings.

In the second embodiment and third and fourth embodiments to be described later, the same elements and operations as those of the first embodiment or other embodiments having been described are denoted by the same reference numerals and thus description thereof will be omitted. The substantial same elements will be denoted by the same element names and description thereof will be simplified.

Configuration of Projection System

FIG. 1 is a diagram illustrating an outer configuration of a projection system 1B according to the second embodiment of the invention.

The projection system 1B includes a PC 2B (image processor), a projector 3B, and an USB cable 4. While the projection system according to the first embodiment displays the presentation images, the projection system 1B displays still images such as photographs.

Configuration of PC

FIG. 2 is a block diagram illustrating a schematic configuration of the PC 2B.

The PC 2B is different from the PC according to the first embodiment in data stored in an auxiliary memory 233 of a controller 23B and process details of an image processing until 235B. The image processing unit 235B is different from the image processing unit according to t-he first embodiment in process details of a current image data acquiring unit 235B1 (image data acquiring unit), a predicted image data acquiring unit 235B2 (subsequent image data acquiring unit, previous image data acquiring unit), and an update image judging unit 235B4 (operation signal detecting unit, update information generating unit) The transmission and reception unit 231 serves as the image data transmitting unit, the subsequent image data transmitting unit, the update information transmitting unit, and the previous image data transmitting unit according to the invention, unlike the first, third, and fourth embodiments.

The auxiliary memory 233 stores a plurality of still image data for displaying still images. The still image data have a structure based on the JPEG (Joint Photographic Experts Group) and are set in the time-series sequence (hereinafter, referred to as a still image sequence) at the time of display on the basis of photographing dates, photographing locations or names of data.

Instead of the still image data, a structure for storing a plurality of moving image data for displaying moving images with the structure based on the MPEG (Motion Picture Experts Group) may be used.

The current image data acquiring unit 235B1 acquires still image data of still images selected by a user from the auxiliary memory 233 under the control of the update image judging unit 235B4. The current image data acquiring unit 235B1 decodes the still image data and generates current image data 620 (image data: see FIGS. 10A and 10B) for allowing the projector 3B to display still images.

The predicted image data acquiring unit 235B2 acquires still image data subsequent to the current image data 620 in the still image sequence under the control of the update image judging unit 235B4 and generates first predicted image data 621 (subsequent image data: see FIGS. 10A and 10B). In additions the predicted image data acquiring unit 235B2 acquires still image data immediately before to the current image data 620 in the still image sequence and generates second predicted image data 622 (previous image data: see FIGS. 10A and 10B) That is, the predicted image data acquiring unit 235B2 generates the first and second predicted image data 621 and 622 for displaying still images subsequent to and previous to the current image data 620 in time series.

When recognizing an operation for displaying a predetermined still image and previously transmitting the current image data 620 to the projector 3B, the update image judging unit 235B4 transmits the current image data 620 of the still image to be displayed.

When recognizing that the operation for updating the still image is not performed in a predetermined time after transmitting the current image data 620, the update image judging unit 235B4 transmits the first and second predicted image data 621 and 622.

When recognizing an operation for updating the displayed image into a predetermined still image in the state where the first and second predicted image data 621 and 622 to the projector 3B are previously transmitted, the update image judging unit 235B4 judges whether the currently displayed image should be updated into the still image subsequent or previous to the currently displayed image in the still image sequence, that is, whether the currently displayed image should be updated into the still images based on the first and second predicted image data 621 and 622 previously transmitted. When it is judged that the currently displayed image should be updated into the still image based on the first predicted image data 621, the update image judging unit 235B4 transmits a first SWAP signal (update information) indicating such an instruction. When it is judged that the currently displayed image should be updated into the still image based on the second predicted image data 622, the update image judging unit 235B4 transmits a second SWAP signal (update information) indicating such an instruction.

On the other hand, when it is judged that the currently displayed image should be updated into a still image not based on the first and second predicted image data 621 and 622, the update image judging unit 235B4 transmits a disuse signal (update information) indicating an instruction for disusing the first and second predicted image data 621 and 622. Further, the update image judging unit 235B4 transmits the current image data 621 of the updated still image.

Figure 9:
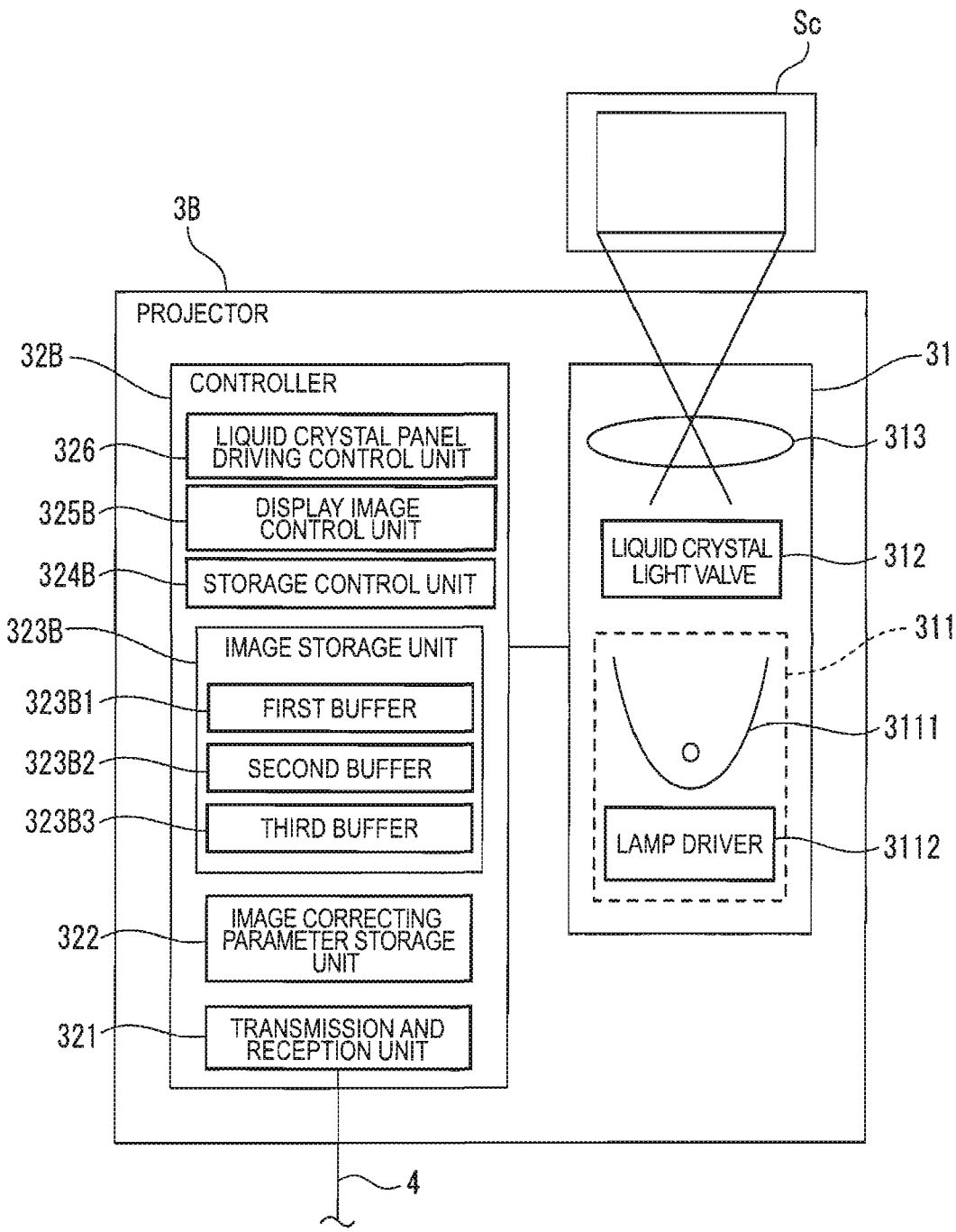
FIG. 9 is a block diagram illustrating a schematic configuration of a projector according to the second embodiment of the invention.

The update image judging unit 235B4 transmits the current image data 620 and the first and second predicted image data 621 and 622 which all have been subjected to an image process, Configuration of Projector FIG. 9 is a block diagram illustrating a schematic configuration of the projector 3B. FIGS. 10A and 10B are schematic diagrams illustrating the still image sequence and a storage state of the image storage unit 323A, where FIG. 10A shows the still image sequence and FIG. 10B shows the storage state of the image storage unit 323B.

The projector 3B is different from the projector according to the first embodiment in the configuration of the image storage unit 323B (storage unit) of the controller 32B and process details of the storage control unit 324B (first storage control unit and second storage control unit) and the display Image control unit 325B (display control unit and image update unit).

The image storage unit 323B includes a first buffer 323B1, a second buffer 323B2, and a third buffer 323B3. The first to third buffers 323B1 to 323B3 appropriately store the current image data 620 and the first and second predicted image data 621 and 622, respectively. That is, when the still image sequence shown in FIG. 10A is set, the first to third buffers 323B1 to 323B3 properly store the current image data 620 of the currently displayed still image, the first predicted image data 621 of the subsequent still image, and the second predicted image data 622 of the immediately before still image, respectively, as shown in FIG. 10B.

The storage control unit 324B performs the process of properly storing the current image data 620 and the first and second predicted image data 621 and 622 from the PC 2B in the image storage unit 323B and a process of disusing the current image data 620 and the like from the image storage unit 323B.

The display image control unit 325B displays the still image based on the current image data 620 when only the current image data 620 is stored in the image storage unit 323B.

The display image control unit 325B continues to display the still image when the first and second predicted image data 621 and 622 are stored in the state where only the current image data 620 is stored in the image storage unit 323B and thus the still image of the current Image data 620 is displayed. That is, as shown in FIG. 10B, when the current image data 620 and the first and second predicted image data 621 and 622 are stored in the image storage unit 323B, the display image control unit 325B displays the still image of the current image data 620.

When the first SWAP signal is acquired in the state shown in FIG. 10B, it means that the prediction is successful. Accordingly, the display image control unit 325B displays the still image of the first predicted image data 621 subsequent in the still image sequence and disuses the current image data 620 and the second predicted image data 622.

When the second SWAP signal is acquired in the state shorn in FIG. 10B, it means that the prediction is successful. Accordingly, the display image control unit 325B displays the still image of the second predicted image data 622 subsequent in the still image sequence and disuses the current image data 620 and the first predicted image data 621.

When the disuse signal is acquired in the state shown in FIG. 10B, it means that the prediction is failed. Accordingly, tile display image control unit 325B disuses the first and second predicted image data 621 and 622 and stores the current image data 620 newly acquired along with the disuse signal. The display image control unit 325B displays the still image of the new current image data 620 and disuses the current image data 620 used in the immediately before display.

Operation of Projection System

An image displaying process will be described as an operation of the above-mentioned projection system 1B.

The projection system 1B will be described with reference to FIGS. 7 and 8 because it performs the same processes as the projection system 1A according to the first embodiment.

Operation of PC

First, the PC 2B performs the processes of steps S101 and S102 as shown in FIG. 7 and generates the first and second predicted image data 621 and 622 based on the still image sequence in step S104 when it is judged in step S103 that the image should not be updated. The PC 2B performs the process of step S105 and judges whether the image should be updated into the subsequent or immediately before image in the still image sequence in step S107, that is, whether the prediction is successful, when it is judged in step S106 that the image should be updated.

When it is judged in step S107 that the prediction is successful, the PC 2B performs a process of generating and transmitting the first SWAP signal or the second SWAP signal in steps S108 and S109 and then performs the process of step S110. When it is judged in step S107 that the prediction is failed, the PC 2B performs the processes of steps S111 to S113 and the process of step S110.

Operation of Projector

As shown in FIG. 8, the projector 3B displays the still image in steps S201 to S203 and then judges whether the first and second predicted image data 621 and 622 are received in step S204. When it is judged in step S204 that the first and second predicted image data 621 and 622 are received, the PC 2B performs the process of step S206 and then judges whether the first SWAP signal or the second SWAP signal is received as the process of judging whether the prediction is successful in step S207.

When it is judged in step S207 that the prediction is successful, the PC 2B displays the still image subsequent or immediately before to the still image currently displayed in step S208.

On the other hand, when it is judged in step S207 that the prediction is failed, the PC 2B deletes the first and second predicted image data 621 and 622 and displays the new still image in steps S209 to S211 and then performs the process of step S205.

Operational Advantage of Second Embodiment

In the second embodiment described above, the following operational advantages can be obtained in addition to the same operational advantages as (1) to (3) of the first embodiment.

(4) The PC 2B of the projection system 1B acquires the second predicted image data 622 temporally previous to the still image of the current image data 62n currently displayed by the projector 3B in the still image sequence and transmits the second predicted image data 622 to the projector 3B in non-synchronization with the transmission of the first and second SWAP signals or the disuse signal. The PC 2B properly transmits a signal indicating that the currently displayed still image should be updated to the projector 3B in response to the operation.

The projector 3B stores the second predicted image data 622 and updates the currently displayed still image into the still image of the second predicted image data 622 when receiving the second SWAP signal indicating the update into the still image of the second predicted image data 622 immediately before to the currently displayed still image in the still image sequence.

Accordingly, the projector 3B can store the second predicted image data 622 transmitted in non-synchronization with the transmission of the second SWAP signal or the like when continuing to display a predetermined still image and can update the currently displayed image into the still image of the second predicted image data 622 stored previously in response to the user's operation indicating that the currently displayed still image should be updated into the immediately before s till image. As a result, it is possible to reduce the amount of data to be transmitted and received after the user's operation and to suppress the delay of the image display from occurring at the time of updating the still image Into the immediately before still image.

Third Embodiment

Next, a third embodiment of the invention will be described with reference to the drawings.

Configuration of Projection System

FIG. 1 is a diagram illustrating an outer configuration of a projection system IC according to the third embodiment of the invention.

The projection, system IC includes a PC 2C (image processor), a projector 3C, and a USB cable 4. While the projection system according to the first embodiment updates the entire presentation image, the projection system IC properly updates a part of the presentation images and displays the updated images.

Configuration of PC

Figure 11:
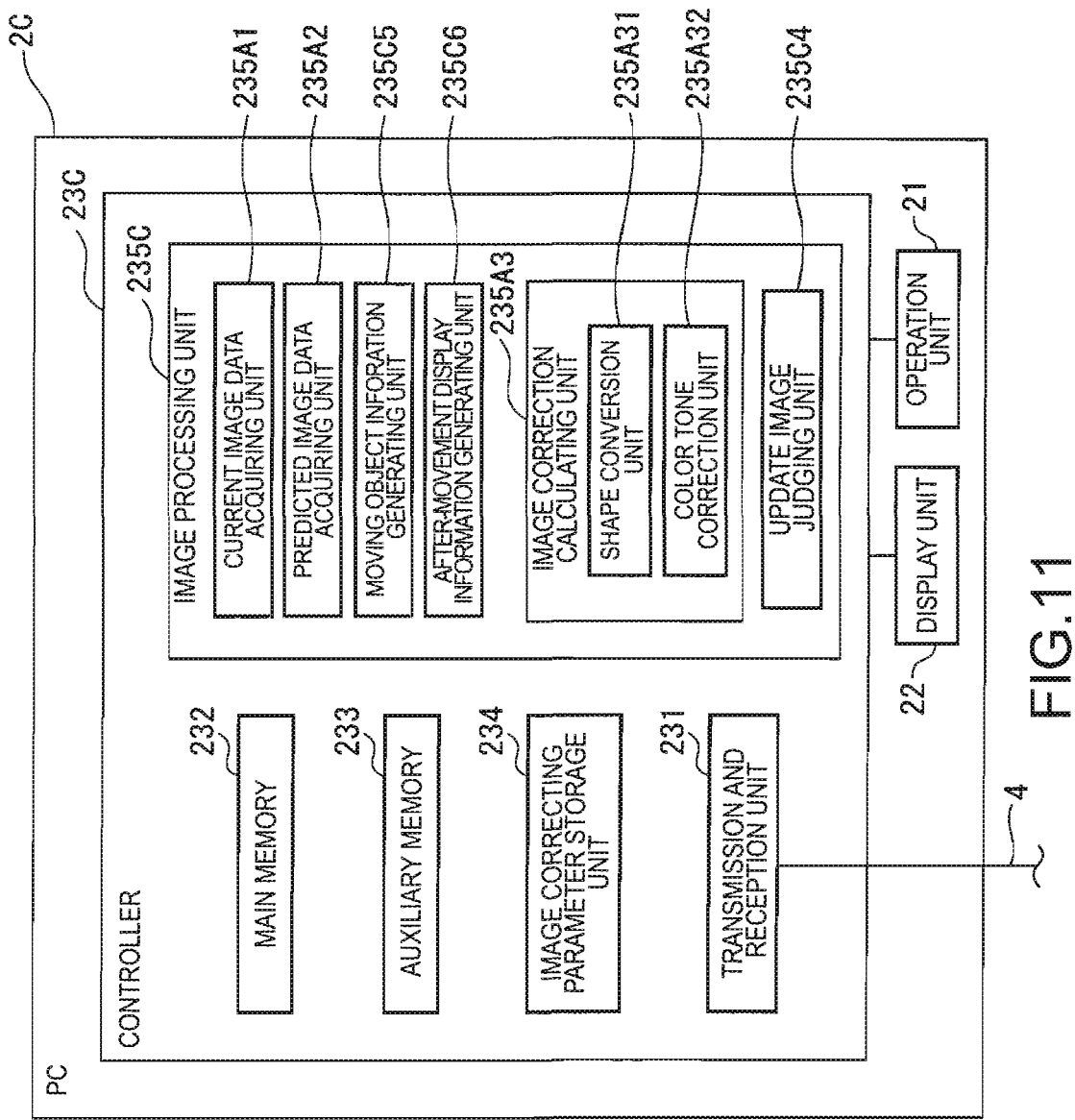
FIG. 11 is a block diagram illustrating a schematic configuration of a PC according to the third embodiment of the invention.
Figure 12:
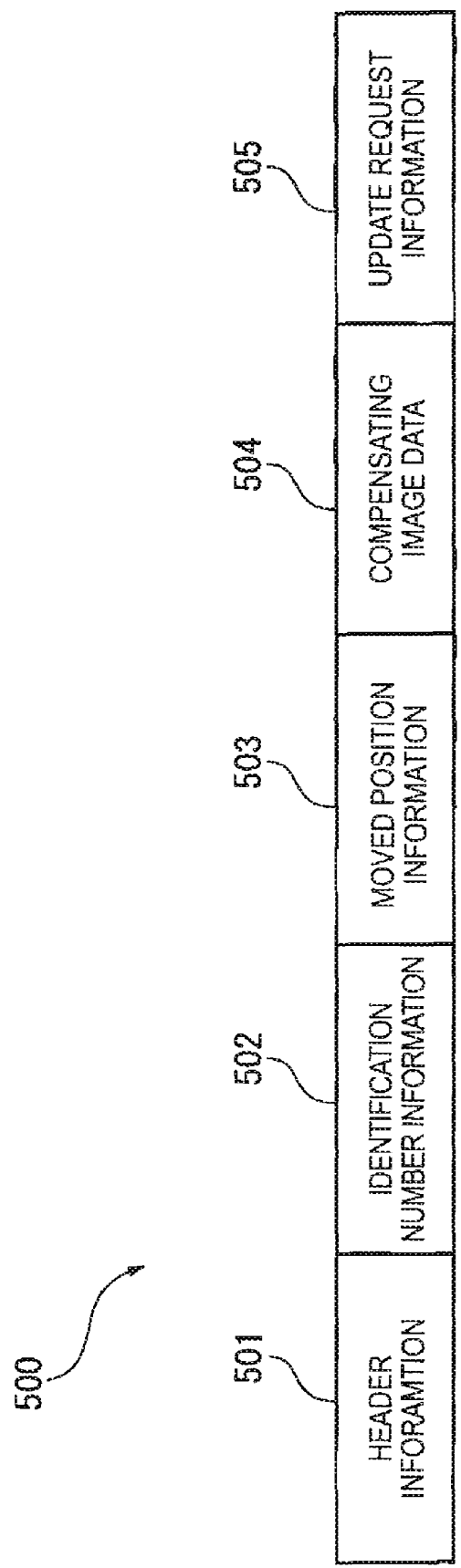
FIG. 12 is a diagram illustrating a schematic configuration of after-movement display information according to the third embodiment of the invention.

FIG. 11 is a block diagram illustrating a schematic configuration of the PC 2C. FIG. 12 is a diagram illustrating a schematic configuration of after-movement display information 500.

The PC 2C is different from those of the first and second embodiments in data stored in the auxiliary memory 233 of a control unit 23C and the process details and configuration of an image processing unit 235C. The image processing unit 235C is different from those of the first and second embodiments in process details of an update image judging unit 235C (operation signal detecting unit and update information generating unit). The image processing unit 235C includes a moving object information generating unit 235C5 and an after-movement display information generating unit 235C6 (update information generating unit).

The auxiliary memory 233 stores, for example, the same presentation image data as the first embodiment. The presentation image data includes presentation image data of a plurality of images in which only a position of a predetermined figure and photograph, or the like included in the images vary but a background does not vary.

Here, an image different from the immediately before image only in positions of an object is referred to as an object-moved image and the other images are referred to as entirely varied images.

When an image subsequent to the current image data 600 in the presentation sequence is an object-moved image, the moving object information generating unit 235C5 generates moving object information for specifying a moving object on the basis of the presentation image data under the control of the update image judging unit 235C4. Here, the moving object information includes, for example, the shape, the color, and the identification number of the object. When a plurality of moving objects exists, the above-mentioned information is included in the moving object information every moving object. The moving object information generating unit 235C5 transmits the moving object information to the projector 3C.

When transmitting the moving object information and then receiving the operation indicating that the currently displayed image should be updated into the object-moved image, the after-movement display information generating unit 235C6 generates the after-movement display information 500 (update information shown in FIG. 12 on the basis of the presentation image data under the control of the update image judging unit 235C4. Then, the after-movement display information generating unit 235C6 transmits the after-movement display information 500 to the projector 3C.

The after-movement display information 500 is used to generate after-movement image data 640 (entire subsequent image data: see FIGS. 14A and 14B) of the object-moved image on the basis of the current image data 600 currently displayed by the projector 3c. The after-movement display information 500 includes header information 501, identification number information 502, moved position information 503, compensating image data 504 (moved-portion image data), and update request information 505.

The identification number information 502 includes the identification number of a moving object. The moved position information 503 includes, for example, XY coordinates indicating the position of the moved object. The compensating image data 504 is data for displaying a compensating image for compensating for the portion where the object has existed before the movement in the object moved image. The update request information 505 includes a request for updating the stored current image data 600 into the after-movement image data 640 on the basis of the after-movement display information 500.

The update Image judging unit 235C4 recognizes an instruction indicating that a predetermined image should be displayed and transmits the current image data 600 of the displayed image, for example, when previously transmitting the current image data 600 to the projector 3C.

When recognizing that an instruction indicating the update of an image is not received in a predetermined time after transmitting the current image data 600, the update image judging unit 235C4 judges whether the image (hereinafter, referred to as "subsequent image") subsequent to the current image data 600 in the presentation sequence is an object moved image. When the subsequent image is the object moved image, the update image judging unit 235C4 controls the moving object information generating unit 235C5 to transmit the moving object information. When recognizing that the instruction indicating the update into the object moved image is received after transmitting the moving object information, the update image judging unit 235C4 judges that the prediction is successful and controls the after-movement display information generating unit 235C6 to transmit the after-movement display information 500. On the other hand, when recognizing that the instruction indicating the update into an image other than the object-moved image is received, the update image judging unit 235C4 judges that the prediction is failed, transmits the disuse signal, and transmits the current image data 600 of the updated image.

The update image judging unit 235C4 performs the same processes as the update image judging unit 235A4 of the first embodiment when the subsequent image is the entirely varied image. That is, the update image judging unit 235C4 controls the predicted image data acquiring unit 235A2 to transmit the predicted image data 601. The update image judging unit 235C4 transmits the SWAP signal or the disuse signal depending on the successfulness of the prediction and transmits the current image data 600 after the update.

Configuration of Projector

Figure 13:
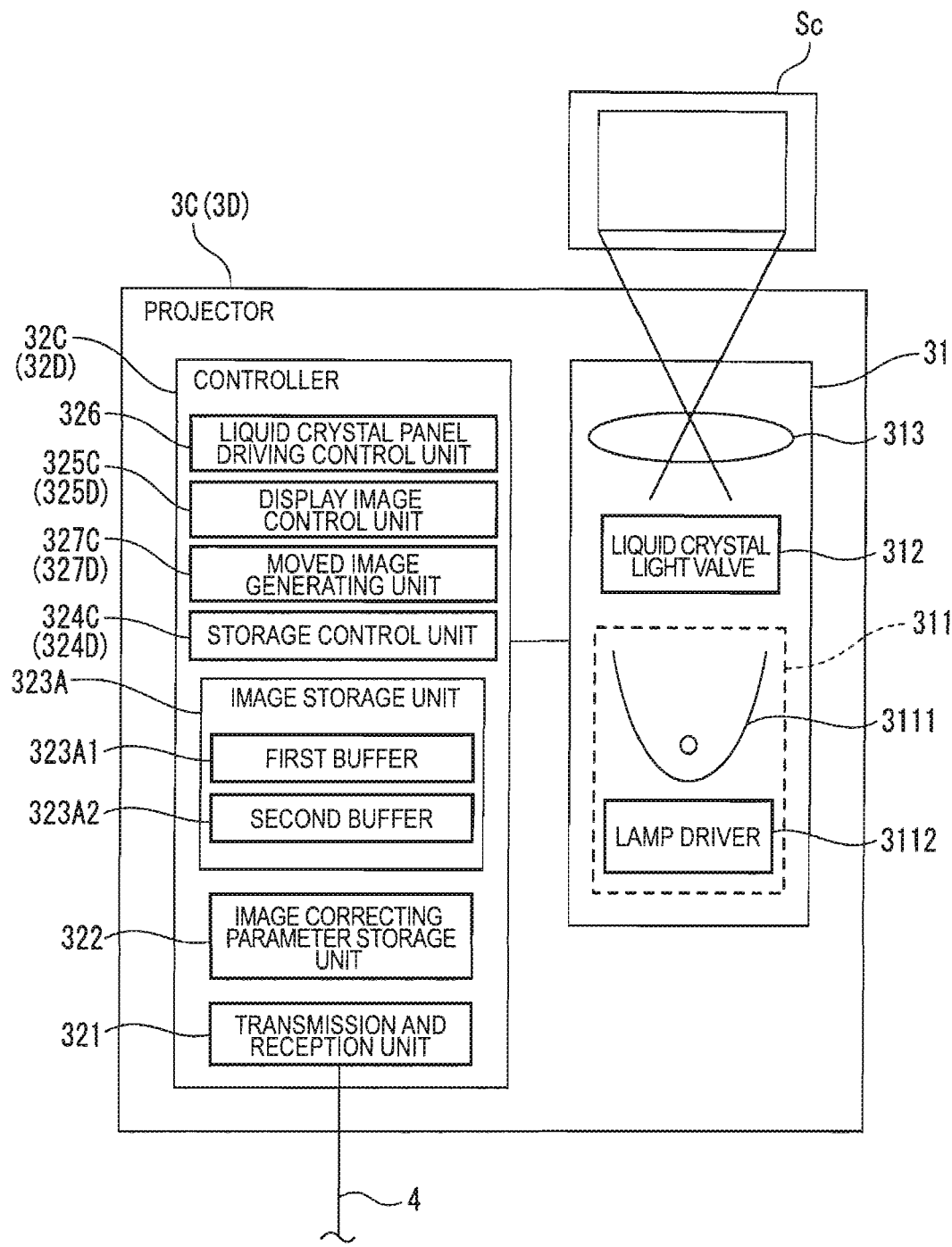
FIG. 13 is a block diagram illustrating a schematic configuration of a projector according to the third embodiment of the invention.
Figure 14A:
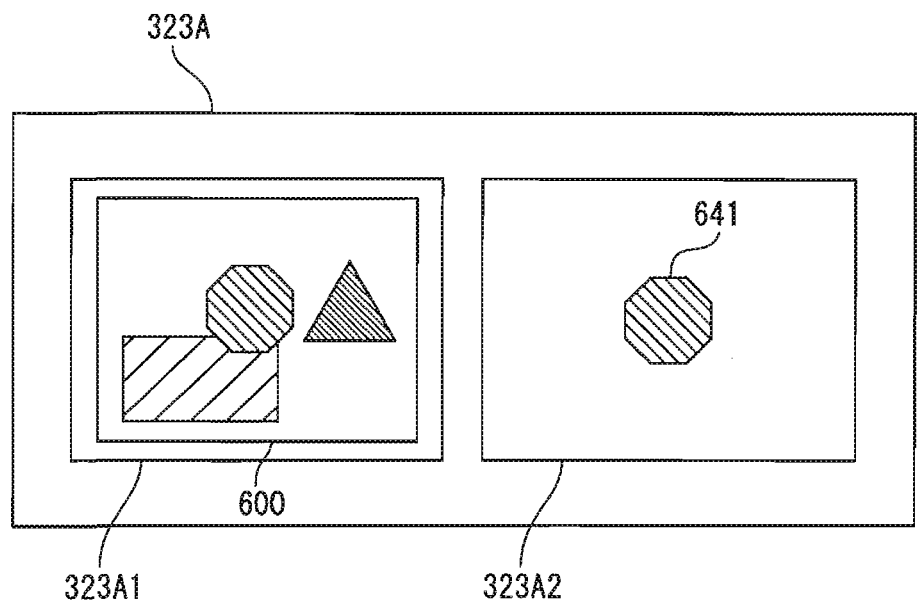
FIGS. 14A and 14B are schematic diagrams illustrating a storage state of an image storage unit according to the third embodiment of the invention, where
Figure 14B:
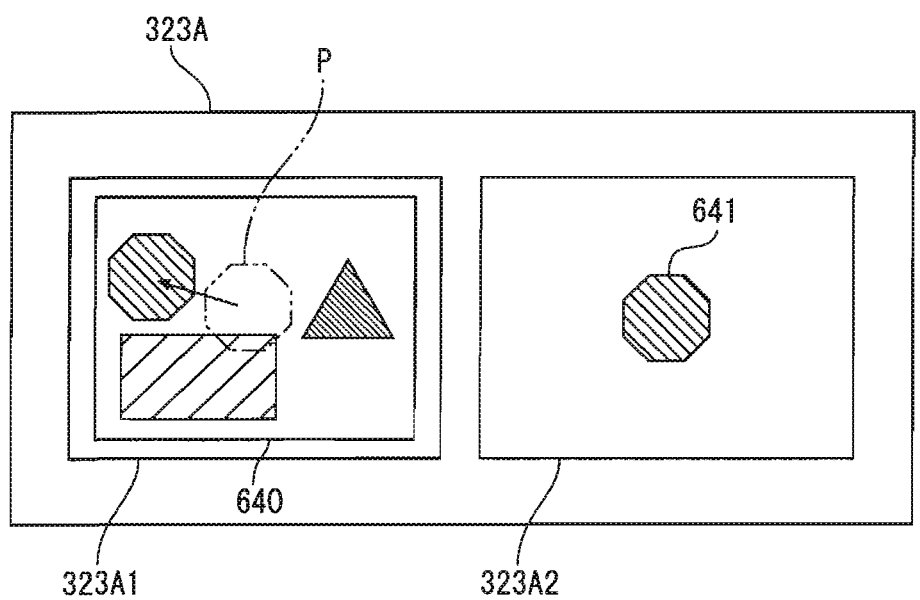

FIG. 13 is a block diagram illustrating a schematic configuration of the projector 3C. FIGS. 14A and 14B are schematic diagrams illustrating a storage state of the image storage unit 323A, where FIG. 14A shows the storage state of the image storage unit 323A when the object image data 641 is generated on the basis of the moving object information and FIG. 14B shows the storage state of the image storage unit 323A when the current image data 600 is updated into the after-movement image data 640 in the state shown in FIG. 14A.

The projector 3C is different from those of the first and second embodiments in process details of a storage control unit 324C (first storage control unit and second storage control unit) and a display image control unit 325C (display control unit and image update unit) of a control unit 32C, as shown in FIG. 13. The control unit 32C includes a moved image generating unit 327C (entire subsequent image data generating unit).

The storage control unit 324C performs a process of properly storing the current image data 600 or the predicted image data 601 from the PC 2C in the image storage unit 323A and a process of disusing the current image data 600 and the like from the image storage unit 323A.

The storage control unit 324C generates and stores the object image data 641 shown in FIG. 14A on the basis of the moving object information and the stored current image data 600, when acquiring the moving object information from the PC 2C. The storage control unit 324C properly disuses the object image data 641.

Specifically, the storage control unit 324C specifies an object included in an image of the current image data 600 on the basis of the shape and color of the moving object information. Then, the storage control unit 324C stores the object image data 641 of the specified object to correspond to the identification number of the moving object information.

The moved image generating unit 327C generates the after-movement image data 640 of the object moved image on the basis of the after-movement display information 500, the stored current image data 600, and the object image data 641. As shown in FIG. 14B, the moved image generating unit 327C updates the stored current image data 600 of the currently displayed image into the after-movement image data 640.

Specifically, the moved image generating unit 327C recognizes the position of the moving object on the basis of the identification number information 502 of the after-movement display information 500, and the moved position information 503. The moved image generating unit 327C moves the object in the currently displayed image, generates the after-movement image data 640 for displaying a compensating image of the compensating image data 504 at the position P where the object has existed, and stores the generated after-movement image data, that is, updates the current image data 600.

The display image control unit 325C displays the image based on the current image data 600 when only the current image data 600 is stored in the image storage unit 323A.

When the predicted image data 601 or the object image data 641 is also stored in the state where only the current image data 600 is stored in the image storage unit 323A and thus the image of the current image data 600 is displayed, the display image control unit 325C continues to display the image. That is, as shown in FIG. 14A, when the current image data 600 and the object image data 641 are stored in the image storage unit 323A, the display image control unit 325C displays the image of the current image data 600.

When the after-movement display information 500 is acquired in the state shown in FIG. 14A, it means that the prediction is successful. Accordingly, the display image control unit 325C recognizes that the object moved image should be displayed and controls the moved image generating unit 327C to update the current image data 600 of the currently displayed image into the after-movement image data 640 as shown in FIG. 14B. Then, the display image control unit 325C displays the object-moved image of the after-movement image data 640.

When the disuse signal is acquired in the state shown in FIG. 14A, it means that the prediction is failed. Accordingly, the display image control unit 325C disuses the object image data 641 and displays an image of the newly acquired current image data 600.

When the predicted image data 601 is stored, the display image control unit 325C performs the same process as tile display image control unit 325A of the first embodiment. That is, when acquiring the SWAP signal or the disuse signal, the display image control unit 325C performs the process of displaying an image of the predicted image data 601 or the new current image data 600 in accordance with the acquired signal.

Operation of Projection System

An image displaying process will be described as an operation of the above-mentioned projection system 1C.

Figure 15:
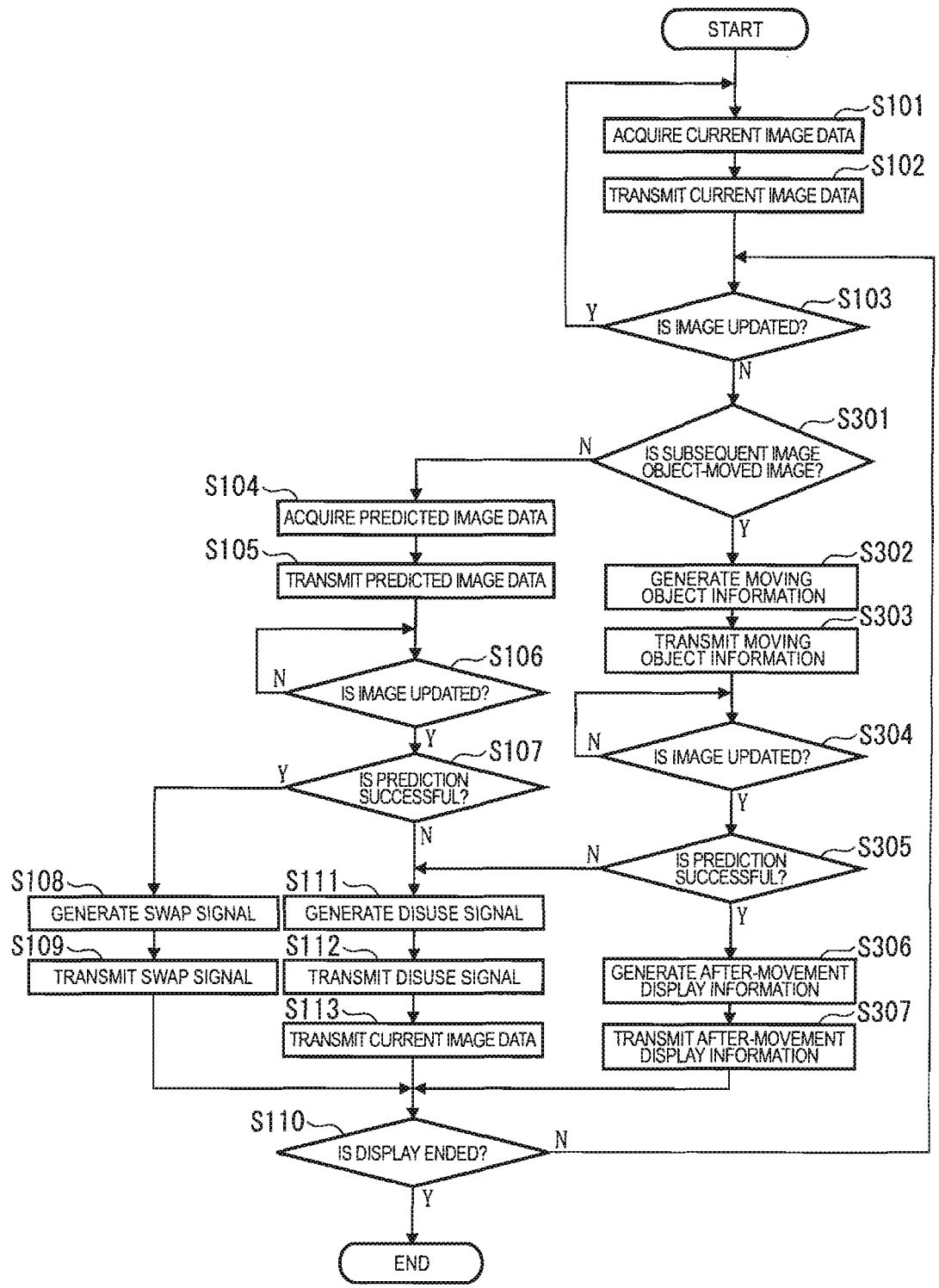
FIG. 15 is a flowchart illustrating an operation of the PC in an image displaying process according to the third embodiment of the invention.
Figure 16:
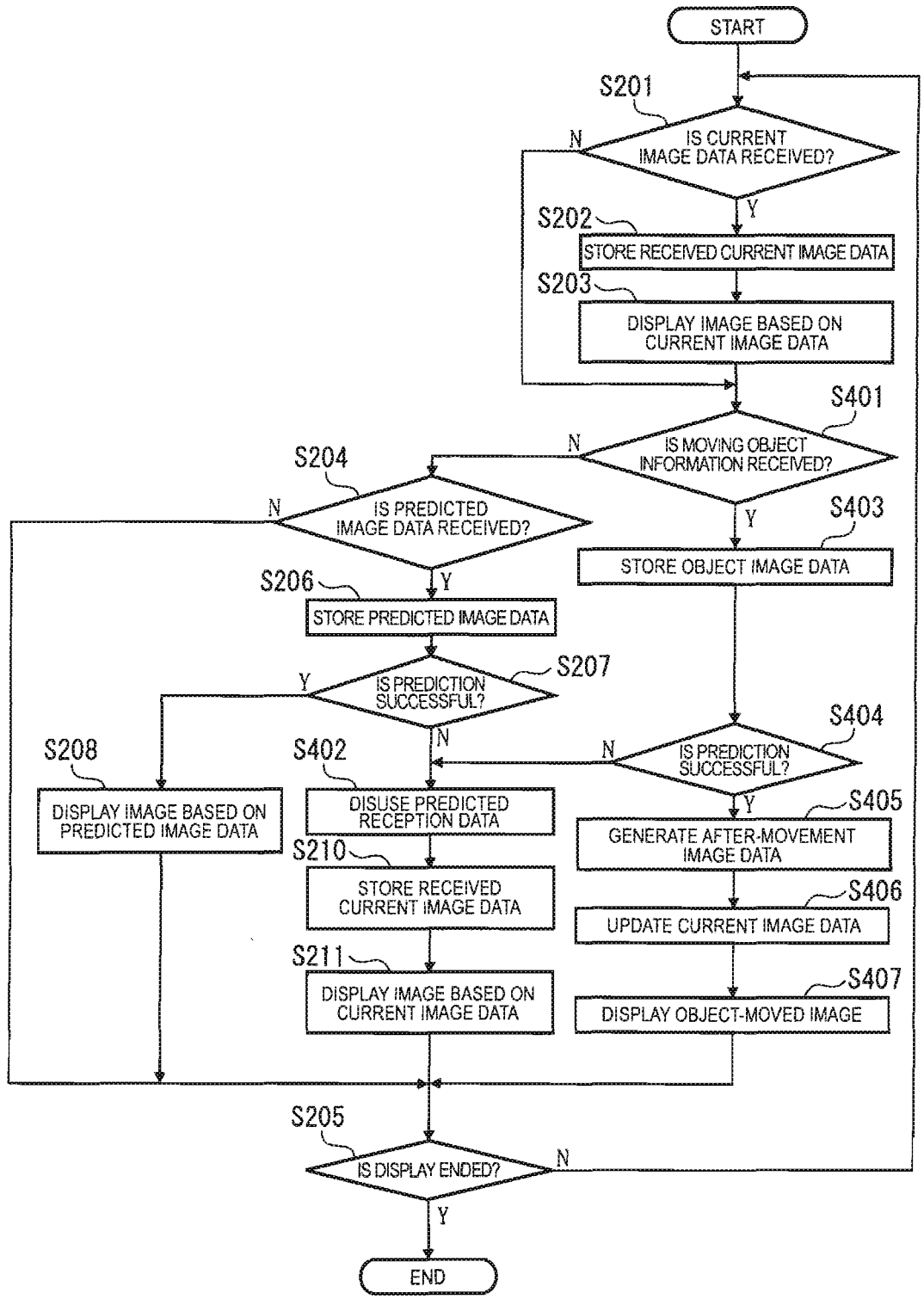
FIG. 16 is a flowchart illustrating an operation of the projector in the image displaying process according to the third embodiment of the invention.

The same processes as the projection system 1A according to the first embodiment are denoted by the same reference numerals and description thereof is omitted or simplified. FIG. 15 is a flowchart illustrating an operation of the PC 2C in the image displaying process. FIG. 16 is a flowchart Illustrating an operation of the projector 3C in the image displaying process.

Operation of PC

First, as show in FIG. 15, the PC 2C performs the processes of steps S101 and S102 and judges whether the subsequent image is the object-moved image (step 5301), when it is judged in step S103 that the image should not be updated. When it is judged in step S301 that the subsequent image is not the object-moved image, that is, that the subsequent image is the entirely varied image, the PC 2C properly performs the processes of steps S104 to S113. The PC 2C performs the process of S103 when it is judged in step S110 that the display is not ended and ends the flow of processes when it is nudged that the display is ended.

On the other hand, when it is judged in step S301 that the subsequent image is the object-moved image, the PC 2C generates the moving object information (step S302) and transmits the generated moving object image to the projector 3C (step S303). Thereafter, the PC 2C judges whether the image should be updated (step S304: detection of operation signal).

When it is judged in step S304 that the image should be updated, the PC 2C judges whether the image should be updated into the object-moved image, that is, whether the prediction is successful (step S305: judgment of update image). When it is judged in step S305 that the prediction is successful, the PC 2C generates the after-movement display information 500 (step S306: generation of update information). Then, the PC 2C transmits the after-movement display information 500 to the protector 3C (step S307: transmission of update information) and then performs the process of step S110.

On the other hand, when it is judged in step S305 that the prediction is failed, the PC 2C performs the process of step S111.

Operation of Projector

As shown in FIG. 16, the projector 3C displays an image by performing the processes of steps S201 to S203 and then judges whether the moving object information is received (S401). When it is judged in step S401 that the moving object information is not received, the projector 3C properly performs the processes of steps S204 to S208. When it is judged in step S207 that the prediction is failed, the projector 3C performs the process of disusing the predicted image data 601 as the process of disusing the predicted reception data (step S402) and performs the processes of steps S201, S211, and S205. The projector 3C performs the process of step S201 again when it is judged in step S205 that the display should not be ended and ends the flow of processes when it is judged that the display should be ended.

On the other hand, when it is judged in step S401 that the moving object information is received, the projector 3C generates and stores the object image data 641 (step S403) Thereafter, the projector 3C judges whether the after-movement display information 500 is received from the PC 2C, that is, whether the prediction is successful (step S404).

When it is judged in step S404 that the prediction is failed, the projector 3C performs the process of disusing the object image data 641 as the process of disusing the predicted reception data in step S402.

On the other hand, when it is judged in step S404 that the prediction is successful, the projector 3C generates the after-movement image data 640 on the basis of the after-movement display information 500 (step S405 and performs the process of updating the current image data 600 (step S406). Then, the projector 3C displays the object-moved image based on the after-movement image data 640 (step S407) and then performs the process of step S205 again.

Operational Advantage of Third Embodiment

In the third embodiment described above, it is possible to obtain the following operational advantages in addition to the same operational advantages as (1) to (3) of the first embodiment.

(5) The PC 2C of the projection system 1C transmits the moving object information on the moving object when recognizing that the subsequent image is the object-moved image. When recognizing that the displayed image should be updated into the object-moved image, the PC 2C transmits the after-movement display information 500 to the projector 3C.

When acquiring the moving object information, the projector 3C generates and stores the object image data 641 on the basis of the moving object information and the stored current image data 600. Thereafter, when acquiring the after-movement display information 500 from the PC 2C, the projector 3C generates the after-movement image data 640 of the object-moved image on the basis of the after-movement display information 500, the stored current image data 600, and the object image data 641 and then displays the object-moved image.

Accordingly, the projector 3C can newly acquire the compensating image data 504 for displaying the compensating image in the portion where the object has existed before the movement and can generate the after-movement image data 640 on the basis of the previously stored current image data 600 and the object image data 641. That is, the projector 3C can generate the after-movement image data 640 without newly acquiring the object of the object-moved image and the portions other than the compensating image, for example, data for displaying the background, from the PC 2C. Accordingly, it is possible to further reduce the amount of data to be transmitted and received after the operation, thereby further suppressing the delay of the image display from occurring.

(6) The PC 2C transmits the moving object information for generating the object image data 641 on the basis of the current image data 600 of the currently displayed image.

The projector 3C generates and stores the object image data 641 on the basis of the moving object information and the stored current image data 600.

Accordingly, the projector 3C can store the object image data 641 without acquiring the object image data 641 from the PC 2C. Therefore, it is possible to further reduce the amount of data to be transmitted and received.

Fourth Embodiment

Next, a fourth embodiment of the invention will be described with reference to the drawings.

Configuration of Projection System

FIG. 1 is a diagram illustrating an outer configuration of a projection system 1D according to the fourth embodiment of the invention.

The projection system 1D includes a PC 2D (image processor), a projector 3D, and a USB cable 4. While the projection systems according to the first to third embodiments update the presentation image or the still image, the projection system 1D updates an image with movement of a processing state display area (hereinafter, referred to as window) as an object which displays a processing state such as preparation of a document or calculation of a table by performing application software and which can be properly moved by a user's operation.

Configuration of PC

Figure 17:
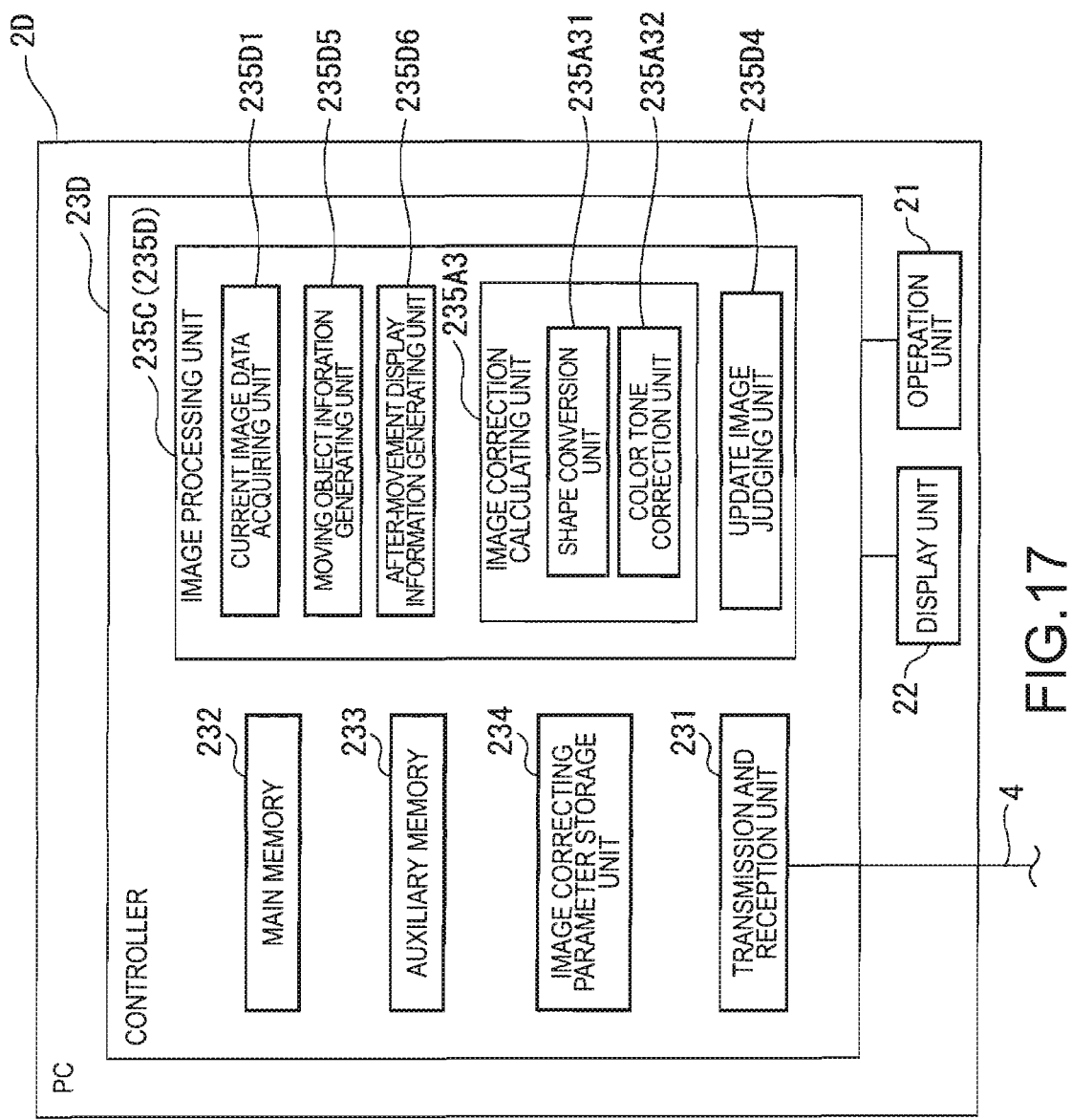
FIG. 17 is a block diagram illustrating a schematic configuration of a PC according to the fourth embodiment of the invention.

FIG. 17 is a block diagram illustrating a schematic configuration of the PC 2D.

The PC 2D is different from that of the third embodiment in process detail s and configuration of an image processing unit 235D of a control unit 23D. The image processing unit 235D is different from that of the third embodiment in process details of a current image data acquiring unit 235D1 (image data acquiring unit), an update image judging unit 235D4 (operation signal detecting unit and update information generating unit), a moving object information generating unit 235D5 (subsequent image data acquiring unit) and an after-movement display information generating unit 235D6 (update information generating unit), and does not have the configuration corresponding to the predicted image data acquiring unit 235A2 of the third embodiment.

When detecting an operation signal indicating that a window for preparing a document should be displayed under the control of the update image judging unit 235D4, the current image data acquiring unit 235D1 generates the current image data (image data) for displaying the window for preparing a document and a background.

For example, when a window for preparing a document is selected as a moving object in a state where the window is displayed, the moving object information generating unit 235D5 generates and acquires window image data (subsequent image data and object image data) for displaying the selected window under the control of the update image judging unit 235D4 and then transmits the acquired window image data to the projector 3D. Here, while the moving object information for allowing the projector 3C to generate the object image data 641 is transmitted in the third embodiment, the window image data corresponding to the object image data 641 is transmitted in the fourth embodiment.

When an operation indicating that the selected window should be moved after the window image data is transmitted, the after-movement display information generating unit 235D6 transmist the same after-movement display information (update information) as the after-movement display information 500 of the third embodiment to the projector 3D under the control of the update image judging unit 235D4.

Here, the after-movement display information transmitted in the fourth embodiment has a structure not including information corresponding to the identification number information 502 among the included in the after-movement display information 500. That is, the after-movement display information includes header information, moved position information indicating the position of the window after the window has been moved, compensating image data for displaying compensating image after the window has been moved, and update request information.

The update image judging unit 235D4 recognizes the operation indicating that a predetermined window should be displayed and transmits the current image data of an image including the window. When recognizing that the predetermined window is selected as the moving object after transmitting the current image data, the update image judging unit 235D4 transmits the window image data of the window.

When recognizing that the selected window should be moved after transmitting the window image data, the update image judging unit 235D4 generates and transmits the after-movement display information on the moved position. Here, when the window is continuously moved, the update image judging unit 235D4 sequentially transmits a plurality of after-movement display information on the positions where the window exists every predetermined time. On the other hand, when recognizing that the movement of the window is ended or that the selected window should not be moved, the update image judging unit 235D4 transmits a disuse signal.

Configuration of Projector

FIG. 13 is a block diagram illustrating a schematic configuration of a projector 3D.

As shown in FIG. 13, the projector 3D is different from that of the third embodiment in process details of a storage control unit 324D (first storage control unit and second storage control unit), a display image control unlit 325D (display control unit and image update unit), and a moved image generating unit 327D (entire subsequent image data generating unit) of a control unit 32D.

The storage control unit 324D performs a process of properly storing the current image data or the window image data from the PC 2D in the image storage unit 323A and a process of disusing the current image data, etc. from the image storage unit 323A.

The moved image generating unit 327D performs the same process as the moved image generating unit 327C of the third embodiment under the control of the display image control unit 325D and generates the after-movement image data (entire subsequent image data) of the image after the movement of the window on the basis of the after-movement display information, the stored current image data, and the window image data. Then, the moved image generating unit 327D updates the stored current image data currently displayed into the after-movement image data.

When only the current image data is stored in the image storage unit 323A, the display image control unit 325D displays the image based on the current image data.

When the window image data is further stored in the state where only the current image data is stored in the image storage unit 323A, the display image control unit 325D continues display the image.

When acquiring the after-movement display information, the display image control unit 325D recognizes that the image in which the window has been moved should be displayed.

The display image control unit 325D controls the moved image generating unit 327D to update the current image data of the currently displayed image into the after-movement image data and to display the image.

For example, when the movement of the window is ended and the disuse signal is acquired, the display image control unit 325D disuses the window image data.

Operation of Projection System

An image displaying process will be described as an operation of the above-mentioned projection system 1D.

Figure 18:
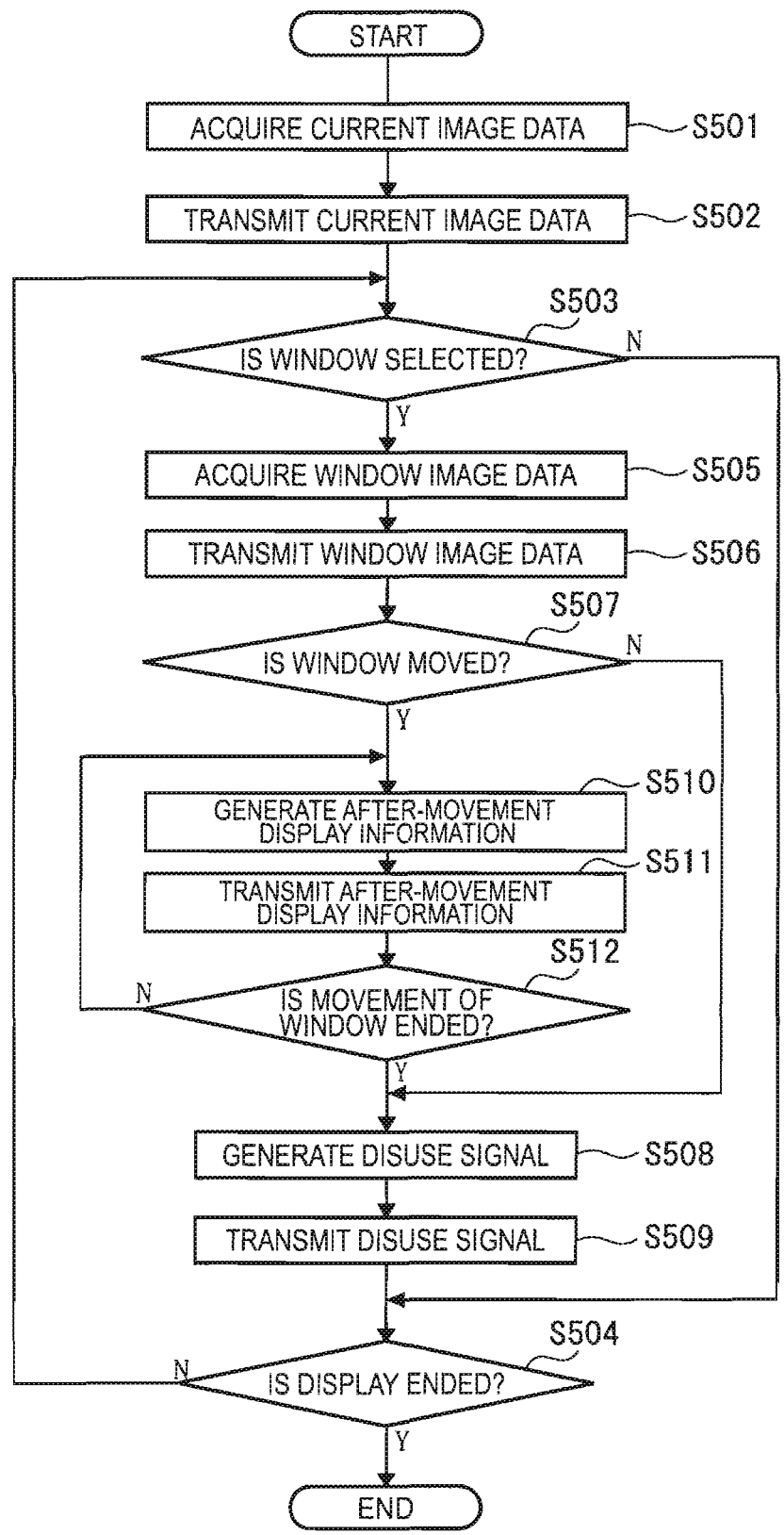
FIG. 18 is a flowchart illustrating an operation of the PC in an image displaying process according to the fourth embodiment of the invention.
Figure 19:
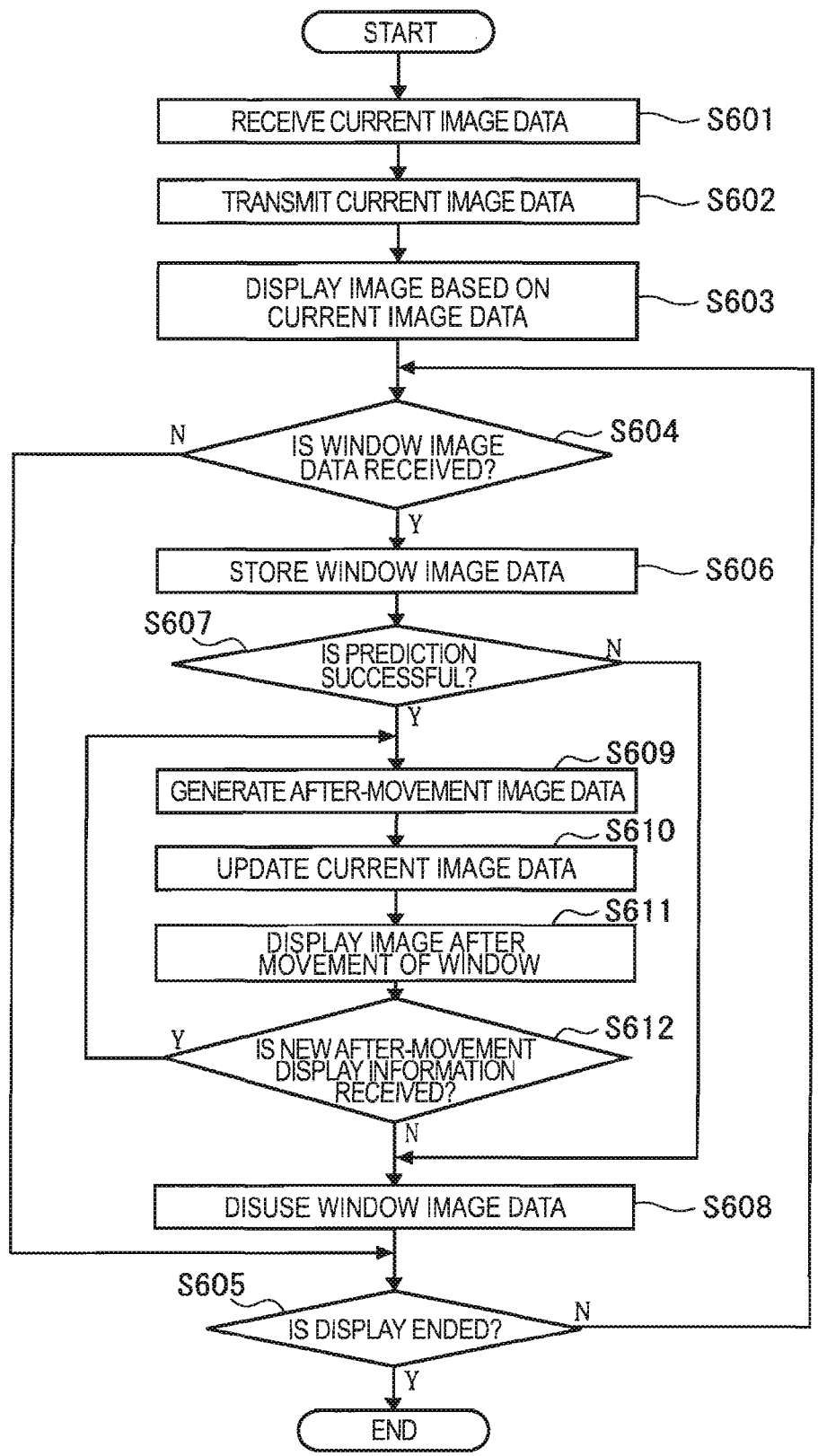
FIG. 19 is a flowchart illustrating an operation of the projector in the image displaying process according to the fourth embodiment of the invention.

FIG. 18 is a flowchart illustrating an operation of the PC 2D in the image displaying process. FIG. 19 is a flowchart illustrating an operation of the projector 3D in the image displaying process.

Operation of PC

When recognizing that a predetermined window should be displayed, the PC 2D first acquires the current image data of the image including the window (step S501: acquisition of image data) and transmits the acquired current image data step S502: transmission of image data) as shown in FIG. 18. The PC 2D judges whether the window included in the image of the current image data is selected to be moved (step S503: detection of operation signal).

When it is judged in step S503 that the window is not selected, the PC 2D judges whether the display is ended (step S504). When it is judged in step S504 that the display is ended, the PC 2D ends the flow of processes. On the other hand, when it is judged in step S504 that the display is not ended, the PC 2D performs the process of step S503.

When it is judged in step S503 that the window is selected, the PC 2D acquires the window image data (step S505: acquisition of subsequent image data) and transmits the acquired window image data to the projector 3D (step S506: transmission of subsequent image data). Then, the PC 2D judges whether the selected window is moved (step S507).

When it is judged in step S507 that the selected window is not moved, the PC 2D generates the disuse signal (step S508: generation of update information), transmits the generated disuse signal (step S509: transmission of update information), and performs the process of step S504 again. On the other hand, when it is judged in step S507 that the selected window is moved, the PC 2D generates the after-movement display information (step S510: generation of update information) and transmits the generated after-movement display information to the projector 3D (step S511: transmission of update information) Thereafter, the PC 2D judges whether the movement of the window is ended (step S512).

When it is judged in step S512 that the movement of the window is ended, the PC 2D performs the process of step S508 again. On the other hand, when it is judged in step S512 that the movement of the window is not ended but is continued, the PC 2D performs the process of step S510 again.

Operation of Projector

As shown in FIG. 19, the projector 3D receives the current image data of the image including the window (step S601) and stores the received current image data (step S602). Thereafter, the projector 3D displays the image based on the current image data (step S603) and judges whether the window image data is received from the PC 2D (step S604).

When it is judged in step S604 that the window image data is not received, the projector 3D judges whether the display is ended (step S605). When it is judged in step S605 that the display is ended, the projector 3D ends the flow of processes. On the other hand, when it is judged in step S605 that the display is not ended, the projector 3D performs the process of step S604 again.

On the other hand, when it is judged in step S604 that the window image data is received, the projector 3D stores the received window image data (step S606) and judges whether the after-movement display information is acquired from the PC 2D, that is, whether the prediction is successful (step S607).

When it is judged in step S607 that the prediction is failed, the projector 3D disuses the window image data (step S608) and then performs the process of step S605 again. On the other hand, when it is judged in step S607 that the prediction is successful, the projector 3D generates the after-movement image data on the basis of the after-movement display information (step S609), performs the process of updating the current image data (step S610) and displays the image in which the window is moved (step S611).

Thereafter, the projector 3D judges whether new after-movement display information is received (step S612). When it is judged in step S612 that new after-movement display information is received, the projector 3D performs the process of step S609 again. On the other hand, when it is judged in step S612 that new after-movement display information is not received, the projector 3D performs the process of step S608 again.

Operational Advantage of Fourth Embodiment

In the fourth embodiment described above, it is possible to obtain the following operational advantages in addition to the same operational advantages as (1) to (3) of the first embodiment and (5); of the third embodiment (7) The projection system 1D performs the image update process with the movement of the window which displays a predetermined processing state and which can be properly moved by the user's operation.

Accordingly, even In the configuration that the window can be properly moved and the processes can be performed in response to the users operation, it is possible to suppress the delay of the image display from occurring.

(8) The PC 2D transmits the window image data of the selected window to the projector 3D.

Accordingly, the protector 3D can update the current image data in the state where the window is moved without generating the window image data. As a result, compared with the third embodiment in which the object image data 641 corresponding to the window image data is generated, it is possible to further simplify the configuration of the projector 3D.

Modification of Embodiments

The invention is non limited to the above-mentioned embodiments, but may include modifications described below so as to obtain the advantages of the invention.

The first and second embodiments may have the following configuration. That is, the PC 2A and 2B may transmit a plurality of predicted image data 601 and the first and second predicted image data 621 and 622 and transmits the SWAP signal for specifying the image selected by the user. The projector 3A and 3B may display the image corresponding to the SWAP signal.

Instead of the configuration of the third embodiment, the configuration of the first embodiment may be used as the configuration for updating a part of the presentation image.

That is, the PC 2C generates a plurality of presentation image data in which the position of the object is slightly varied by rehearsing before starting the presentation. Then, the PC 2C properly transmits the presentation image data as the current image data or the predicted image data and the projector 3C displays the presentation image.

Like the fourth embodiment, in the third embodiment, the PC 2C may transmit the object image data 641 to the projector 3C, instead of the moving object information.

Like the third embodiment, in the fourth embodiment, the PC 2D may transmit the moving object information to the projector 3D, instead of the window image data and the projector 3D may generate and store the window image data based on the moving object information.

The fourth embodiment may have the following configuration. That is, the PC 2D transmits the current image data of an image having no object or window and transmits the after-movement display information not including the compensating image data. Then, the projector 3D generates the after-movement image data on the basis of the current image data, the after-movement display information, and the window image data. The fourth embodiment may employ the same configuration as the third embodiment.

Although the best configuration for carrying out the invention has been described above, the invention is not limited to the best configuration. That is, although the invention has been described and shown mainly with reference to the specific embodiments, it will be understood by those skilled in the art that the quantities and other detailed configurations of the embodiments may be modified in various ways without departing from the technical spirit and scope of the invention.

The invention can be applied to a projection system.

The entire disclosure of Japanese Patent Application No.2006-40483, filed Feb. 17, 2006 is expressly incorporated by reference herein.

What is claimed is:

1. A projection system comprising:
an image processor processing image data;
a projector modulating a light beam emitted from a light source device on the basis of the image data processed by the image processor; and
an information transmitting unit connecting the image processor and the projector to each other so as to transmit and receive information therebetween,
wherein the image processor includes:
a predicting unit predicting a subsequent image in a presentation sequence that is temporarily subsequent to an image currently displayed by the projector, wherein the presentation sequence is a previously set sequence;
a transmitting unit transmitting subsequent image data which corresponds to the subsequent image predicted by the predicting unit;
an operation signal detecting unit detecting an operation signal, which indicates that the currently displayed image is updated into a predetermined image, after the transmitting unit transmitted the subsequent image data;
an update image judging unit comparing the predetermined image with the predicted subsequent image other than the currently displayed image;
an update information generating unit capable of generating update information indicating that the currently displayed image is updated into either one of the predicted subsequent image other than the currently displayed image and an image other than the predicted subsequent image on the basis of the comparison result of the update image judging unit;
an update information transmitting unit transmitting the update information; and
wherein the projector includes:
a projector reception unit receiving the subsequent image data and the update information;
a storage unit capable of storing a plurality of the subsequent image data;
a display control unit displaying an image based on the image data; and an image update unit updating the currently displayed image into the predicted subsequent image on the basis of the subsequent image data when the update information received by the projector reception unit indicates that the currently displayed image is updated into the predicted subsequent image.

2. The projection system according to claim 1, wherein when the update information generating unit generates the update information indicating that the currently displayed image is updated into the image other than the predicted subsequent image, the image data acquiring unit acquires new image data for displaying the updated image, wherein a first storage control unit stores the new image data in the storage unit, wherein a second storage control unit deletes the stored subsequent image data when the new image data is stored, and wherein the image update unit updates the currently displayed image into the image other than the predicted subsequent image on the basis of the new image data.

3. The projection system according to claim 1, wherein the image processor further includes:

a previous image data acquiring unit acquiring previous image data having an object included in an image temporarily previous to an image currently displayed by the projector on the basis of the image data acquired by the image data acquiring unit; and a previous image data transmitting unit transmitting the previous image data in non-synchronization with the update information transmitting unit, wherein the update image judging unit compares the predetermined image with the previous image including the object of the previous image data acquired by the previous image data acquiring unit, wherein the update information generating unit generates the update information indicating that the currently displayed image is updated into the previous image or an image other than the previous image, wherein the projector reception unit acquires the previous image data, wherein a second storage control unit stores the previous image data in the storage unit, and wherein the image update unit updates the currently displayed image into the previous image on the basis of the previous image data when the update information indicates that the currently displayed image is updated into the previous image.

4. The projection system according to claim 1, wherein the predicted subsequent image has the object moved from a position in the current displayed image, wherein the subsequent image data is object image data having only the object, wherein the update information generating unit generates moved position information on a position of a movement destination of the object and after-movement display information having moved-portion image data for displaying a predetermined image at the position where the object has existed before the movement as the update information, when recognizing that the currently displayed image is updated into the predicted subsequent image on the basis of the comparison result, wherein the projector further includes an entire subsequent image data generating unit generating entire subsequent image data for displaying the entire predicted subsequent image on the basis of the after-movement display information, the image data of the currently displayed image, and the object image data, wherein a second storage control unit stores the entire subsequent image data instead of the image data of the currently displayed image, and wherein the image update unit updates the currently displayed image into the predicted subsequent image on the basis of the entire subsequent image data, when recognizing that the projector reception unit receives the after-movement display information as the update information.

5. The projection system according to claim 4, wherein the object is a processing state display area which displays a predetermined processing state and which can be moved in response to the operation signal from the operation unit.

6. The projection system according to claim 1, wherein the transmitted image data is uncompressed.

7. An image processor which is connected to a projector so as to transmit and receive information therebetween through an information transmitting unit and which processes image data, the image processor comprising:

an image data acquiring unit acquiring the image data;

a predicting unit predicting a subsequent image in a presentation sequence that is temporarily subsequent to an image currently displayed by the projector unit, wherein the presentation sequence is a previously set sequence:

a transmitting unit transmitting subsequent image data which corresponds to the subsequent image predicted by the predicting unit;

an operation signal detecting unit detecting an operation signal, which indicates that the currently displayed image is updated into a predetermined image, after the transmitting unit transmitted the subsequent image data;

an update image judging unit comparing the predetermined image with the predicted subsequent image other than the currently displayed image;

an update information generating unit capable of generating update information indicating that the currently displayed image is updated into either one of the predicted subsequent image other than the currently displayed image and an image other than the predicted subsequent image on the basis of the comparison result of the update image judging unit; and an update information transmitting unit transmitting the update information.

8. An image processing method of processing image data in an image processor connected to a projector so as to transmit and receive information therebetween through an information transmitting unit, the image processing method comprising:

predicting subsequent image data having an object included in an image temporarily subsequent in a presentation sequence to an image currently displayed by the projector, wherein the presentation sequence is a previously set sequence;

transmitting the subsequent image data which corresponds to the subsequent image predicted by the predicting unit;

detecting an operation signal, which indicates that the currently displayed image is updated into a predetermined image, after transmitting the subsequent image data;

comparing the predetermined image with the predicted subsequent image other than the currently displayed image;

generating update information indicating that the currently displayed image is updated into either one of the predicted subsequent image other than the currently displayed image and an image other than the predicted subsequent image on the basis of the comparison result;

transmitting the update information.

* * * * *